United States Patent
Harper et al.

(10) Patent No.: US 11,512,173 B2
(45) Date of Patent: Nov. 29, 2022

(54) METHOD OF PRODUCING CARBON FIBERS AND CARBON FIBER COMPOSITES FROM PLANT DERIVED LIGNIN AND ITS BLENDS

(71) Applicants: University of Tennessee Research Foundation, Knoxville, TN (US); TennEra, LLC, Knoxville, TN (US)

(72) Inventors: David Paul Harper, Knoxville, TN (US); Omid Hosseinaei, Knoxville, TN (US); Dayakar Penumadu, Knoxville, TN (US); Nathan Kieran Meek, Knoxville, TN (US); Daniel Webb, Knoxville, TN (US); James Mynes, Acworth, GA (US); Nicole Labbe, Knoxville, TN (US); Joseph John Bozell, Knoxville, TN (US); Timothy G. Rials, Knoxville, TN (US); Stephen Andrew Young, Knoxville, TN (US)

(73) Assignees: University of Tennessee Research Foundation, Knoxville, TN (US); TennEra, LLC, Knoxville, TN (US)

( * ) Notice: Subject to any disclaimer, the term of this patent is extended or adjusted under 35 U.S.C. 154(b) by 478 days.

(21) Appl. No.: 15/799,240

(22) Filed: Oct. 31, 2017

(65) Prior Publication Data
US 2018/0118901 A1    May 3, 2018

Related U.S. Application Data

(60) Provisional application No. 62/415,085, filed on Oct. 31, 2016.

(51) Int. Cl.
*C08J 5/04* (2006.01)
*D01F 9/17* (2006.01)
(Continued)

(52) U.S. Cl.
CPC .............. *C08J 5/042* (2013.01); *C08J 5/24* (2013.01); *C08K 3/04* (2013.01); *C08K 7/06* (2013.01);
(Continued)

(58) Field of Classification Search
CPC ...................................... C08J 5/24; D01F 9/17
See application file for complete search history.

(56) References Cited

U.S. PATENT DOCUMENTS

| 3,585,104 A | 6/1971 | Kleinert |
| 4,764,596 A | 8/1988 | Lora et al. |

(Continued)

FOREIGN PATENT DOCUMENTS

WO    WO 2016/033456    3/2016

OTHER PUBLICATIONS

Grimsley, B.W., P. Hubert, X.-L. Song, R.J. Cano, A.C. Loos, P.R. Byron, Flow and Compaction During the Vacuum Assisted Resin Transfer Molding Process, NASA Langley Research Center (2001), 14 pages. (Year: 2001).*

(Continued)

*Primary Examiner* — Matthew J Daniels
(74) *Attorney, Agent, or Firm* — Jenkins, Wilson, Taylor & Hunt, P.A.

(57) ABSTRACT

Carbon fiber composites containing lignin carbon fibers are described. The lignin carbon fibers can be derived from organosolv lignin obtained from single source lignocellulosic feedstocks or combinations of such feedstocks or lignin obtained via other pulping or extraction methods. Also described are methods of preparing the carbon fiber composites.

18 Claims, 13 Drawing Sheets

(51) Int. Cl.
C08J 5/24 (2006.01)
C08K 7/06 (2006.01)
C08K 3/04 (2006.01)
(52) U.S. Cl.
CPC ............ *D01F 9/17* (2013.01); *C08J 2363/00* (2013.01); *C08K 2201/003* (2013.01); *D10B 2401/063* (2013.01); *D10B 2505/02* (2013.01)

(56) References Cited

U.S. PATENT DOCUMENTS

| | | | |
|---|---|---|---|
| 5,730,837 | A | 3/1998 | Black et al. |
| 8,796,631 | B2 | 8/2014 | Penumadu et al. |
| 9,382,282 | B2 | 7/2016 | Bozell et al. |
| 9,411,058 | B2 | 8/2016 | Penumadu |
| 10,145,063 | B2 | 12/2018 | Bozell et al. |
| 2014/0271443 | A1 | 9/2014 | Baker et al. |
| 2015/0233023 | A1 | 8/2015 | Chang et al. |
| 2017/0247834 | A1 | 8/2017 | Bozell et al. |
| 2019/0193338 | A1 | 6/2019 | Penumadu |
| 2020/0072718 | A1 | 3/2020 | Penumadu et al. |

OTHER PUBLICATIONS

Chatterjee, S., et al., Conversion of Lignin Precursors to Carbon Fibers with Nanoscale Graphitic Domains, ACS Sustainable Chem. Eng., vol. 2 (2014), pp. 2002-2010. (Year: 2014).*
Chen, Keke, Bio-renewable fibers extracted from lignin/polylactide (PLA) blend, Iowa State University (2012), 60 pages. (Year: 2012).*
Foston, M., et al., NMR a critical tool to study the production of carbon fiber from lignin, Carbon, vol. 52 (2013), pp. 65-73. (Year: 2013).*
Hashemi-Motlagh, G., M.R. Thompson, A.N. Hrymak, Electrically Conductive Carbon Fiber-Carbon Black Polymer Composites: Synergism and Carbon Fiber Orientation, The Polymer Processing Society 23rd Annual Meeting, (2007), 9 pages. (Year: 2007).*
Baker et al. (2012) On the characterization and spinning of an organic-purified lignin toward the manufacture of low-cost carbon fiber. Journal of Applied Polymer Science 124(1):227-234.
Beetz (1982) A Self-Consistent Weibull Analysis of Carbon Fibre Strength Distribution. Fiber Sci. and Tech. Fibre Sci and Tech 16:81-94.
Bose et al. (2009) Lignin content versus syringyl to guaiacyl ratio amongst poplars. Bioresour. Technol 100(4):1628-1633.
Bozell et al. (2011) Solvent fractionation of renewable woody feedstocks: Organosolv generation of biorefinery process streams for the production of biobased chemicals. Biomass and Bioenergy 35(10):4197-4208.
Brodin et al. (2009) Kraft lignin as feedstock for chemical products: The effects of membrane filtration. Holzforschung 63:290-297.
Brodin et al. (2010) The Behavior of Kraft Lignin During Thermal Treatment. Journal of Analytical and Applied Pyrolysis 87:70-77.
Brodin et al. (2012) Oxidative Stabilization of Kraft Lignin for Carbon Fibre Production. Holzforschung 66:141-147.
Feih and Mouritz (2012) Tensile properties of carbon fibres and carbon fibre-polymer composites in fire. Composites Part A: Applied Science and Manufacturing 43(5):765-772.
Fengel and Wegener (1984) Wood: Chemistry, Ultrastructure, Reaction. Walter de Gruyter, Berlin and New York. 132-181.
Hu et al. (2010) Chemical profiles of switchgrass. Bioresource Technology 101(9):3253-3257.
Ishitani (1981) Application of X-ray photoelectron spectroscopy to surface analysis of carbon fiber. Carbon 19(4):269-275.
Kadla et al. (2002) Lignin-based carbon fibers for composite fiber applications. Carbon 40:2913-2920.
Kant and Penumadu (2014) Dynamic mechanical characterization for nonlinear behavior of single carbon fibers. Composites Part A—Applied Science and Manufacturing 66:201-208.
Kim and Nairn (2002) Observations of Fiber Fracture and Interfacial Debonding Phenomena Using the Fragmentation Test in Single Fiber Composites. Journal of Composite Materials 36(15):1825-1858.
Lew et al. (2007) The Effect of Silica (SiO2) Nanoparticles and Ammonia/Ethylene Plasma Treatment on the Interfacial and Mechanical Properties of Carbon-Fiber-Reinforced Epoxy Composites. Journal of Adhesion Science and Technology 21(14):1407-1424.
Lin et al. (2014) Improvement of Mechanical Properties of Softwood Lignin-Based Carbon Fibers. Journal of Wood Chemistry and Technology 34(2):111-121.
Ma et al. (2015) High-Strength Composite Fibers from Cellulose-Lignin Blends Regenerated from Ionic Liquid Solution. ChemSusChem 8(23):4030-4039.
Mulchandani et al. (2006) Biotechnology for Fuels and Chemicals. Applied Biochemistry and Biotechnology 129-132:1-1116.
Naito et al. (publication date unknown) Tensile Properties of Carbon Nanotubes Grafted High Strength Pan-Based Carbon Fibers. 18th International Conference on Composite Materials 1-5.
Naito et al. (2012) The effect of gauge length on tensile strength and Weibull modulus of polyacrylonitrile (PAN)- and pitch-based carbon fibers. Journal of Materials Science 47(2):632-642.
Norberg et al. (2013) A new method for stabilizing softwood kraft lignin fibers for carbon fiber production. Journal of Applied Polymer Science 128(6):3824-3830.
Nordström et al. (2013) Mechanical characterization and application of Weibull statistics to the strength of softwood lignin-based carbon fibers. Journal of Applied Polymer Science 130(5):3689-3697.
Okoli and Smith (1998) Failure modes of fibre reinforced composites: the effects of strain rate and fibre content. Journal of Materials Science 33:5415-5422.
Park (2000) Interfacial Properties of Two-Carbon Fiber Reinforced Polycarbonate Composites Using Two-Synthesized Graft Copolymers as Coupling Agents. J. Colloid Interface Sci. 225(2):384-393.
Ramirez et al. (2008) Evaluation of Water Degradation of Vinylester and Epoxy Matrix Composites by Single Fiber and Composite Tests. Journal of Materials Science 43:5230-5242.
Rich et al. (2012) Round Robin Assessment of the Single Fiber Fragmentation Test. American Society for Composites. West Lafayette, Indiana. [9, 28].
Sudo and Shimizu (1992) A new carbon fiber from lignin. Journal of Applied Polymer Science 44:127-134.
Wilson (1997) Statistical tensile strength of NextelTM 610 and NextelTM 720 fibres. Journal of Materials Science 32(10):2535-2542.
Yumitori (2000) Correlation of C1s chemical state intensities with the O1s intensity in the XPS analysis of anodically oxidized glass-like carbon samples. Journal of Materials Science 35:139-146.
Zhou et al. (2010) Tensile behavior of carbon fiber bundles at different strain rates. Materials Letters 64(3):246-248.
Zhao et al. (2012) A Comparative Study of Fibre/Matrix Interface in Glass Fibre Reinforced Polyvinylidene Fluoride Composites. Colloids and Surfaces A: Physicochemical and Engineering Aspects 413:58-64.
Davison et al. (2006) Applied Biochemistry and Biotechnology 129-32:427-435.
Hosseinaei et al. (2016) Role of Physiochemical Structure of Organosolv Hardwood and Herbaceous Lignins on Carbon Fiber Performance. ACS Sustainable Chem. Eng. 4(10):5785-5798.
Meek et al. (2016). Development of Lignin Carbon Fiber and Reinforced Composites. Masters Thesis.
Meek et al. (2016) Synthesis and Characterization of Lignin Carbon Fiber and Composites. Composties Science and Technology 137:60-68.
Naito et al. (2011) Tensile and Fexural Properties of Single Carbon Fibers. ICCM-18. Jeju Island, South Korea.
Postema et al., Amorphous carbon fibres from linear low density polyethylene, J. of Materials Science, vol. 25, No. 10, pp. 4216-4222 (1990).
Baker and Rials (2013) Recent advances in low-cost carbon fiber manufacture from lignin. Journal of Applied Polymer Science 130(2):713-728.

(56) References Cited

OTHER PUBLICATIONS

Favier et al. (2004) CoCl2 catalysed decarboxylation-oxidation of mandelic acids by molecular oxygen. New J. Chem. 28:62-66.

Feih et al. (2004) Testing Procedure for the Single Fiber Fragmentation Test. Technical University of Denmark. Risø National Laboratory. pp. 1-31.

Klug and Alexander (1974) X-Ray Diffraction Procedures for Polycrystalline and Amorphous Materials. J of Chem Ed. p. 228.

Paul et al. (2015) Recent Progress in Producing Lignin-Based Carbon Fibers for Functional Applications. GrafTech International Holdings, Inc. pp. 1-15.

Sager et al. (2009) Effect of carbon nanotubes on the interfacial shear strength of T650 carbon fiber in an epoxy matrix. Composites Science and Technology 69(7-8):898-904.

Saito et al. (2014) Methanol Fractionation of Softwood Kraft Lignin: Impact on the Lignin Properties. ChemSusChem 7(1):221-228.

Sluiter et al. (2008) Determination of Structural Carbohydrates and Lignin in Biomass. Laboratory Analytical Procedure (LAP). National Renewable Laboratory. pp. 1-18.

U.S. Environmental Protection Agency (Oct. 15, 2012) 2017 and Later Model Year Light-Duty Vehicle Greenhouse Gas Emissions and Corporate Average Fuel Economy Standards. Rules and Regulations. Federal Register 77(199) 62624-63200.

Van der Zwaag (1989) The Concept of Filament Strength and the Weibull Modulus. Journal of Testing and Evaluation 17(5):292-298.

Garcia-Negron et al. (2020) Elucidating nano and meso-structures of lignin carbon composites: A comprehensive study of feedstock and temperature dependence. Carbon 161:856-869.

Hosseinaei et al. (2017) Improving processing and performance of pure lignin carbon fibers through hardwood and herbaceous lignin blends. International Journal of Molecular Sciences. 18(7): 1410, pp. 1-13.

Kadla et al. (2002b) "Lignin-Based Carbon Fibers" in Chemical Modification, Properties, and Usage of Lignin, Hu, T.Q. (ed), Springer, pp. 121-137.

Liu et al. (2008) "Progressive failure analysis of carbon fiber/epoxy composite laminates using continuum damage mechanics," Materials Science and Engineering A, 485, pp. 711-717.

Sluiter et al. (2008b) "Determination of Ash in Biomass," Laboratory Analytical Procedure (LAP), National Renewable Energy Laboratory, Technical Report NREL/TP-510-42622, pp. 1-5.

Garcia-Negron et al. (2018) Polymer morphology of lignin in carbon fiber precursors from hardwood and herbaceous feedstocks. Abstract of poster presented at the 255th National Meeting of the American Chemical Society, Mar. 14-21, 2018, New Orleans, Louisiana (4 pages, downloaded from www.morressier.com/article/polymer-morphology-lignin-carbon-fiber-precursors-hardwood-herbaceous-feedstocks/5fc640832d78d1fec4647589? on Mar. 2, 2021).

Arato et al. "The Lignol Approach to Biorefining of Woody Biomass to Produce Ethanol and Chemicals," Applied Biochemistry and Biotechnology, vol. 121-124, pp. 871-882 (2005).

Garcia-Negron et al. (2017) "Processing-property-structure relationships of carbonaceous materials derived from renewable lignin products," Master's Thesis presented for the Master of Science Degree at the University of Tennessee, Knoxville, Tennessee, 99 pages (2017).

Garcia-Negron et al. (2017) "Processing-Structure-Property Relationships for Lignin-Based Carbonaceous Materials Used in Energy-Storage Applications," Energy Technology, vol. 5, pp. 1311-1321.

Garcia-Negron et al. (2022) "Development of Nanocrystalline Graphite from Lignin Sources," with Supplementary Information, ACS sustainable Chemistry & Engineering, vol. 10, pp. 1786-1794, S1-S9 (18 pages).

* cited by examiner

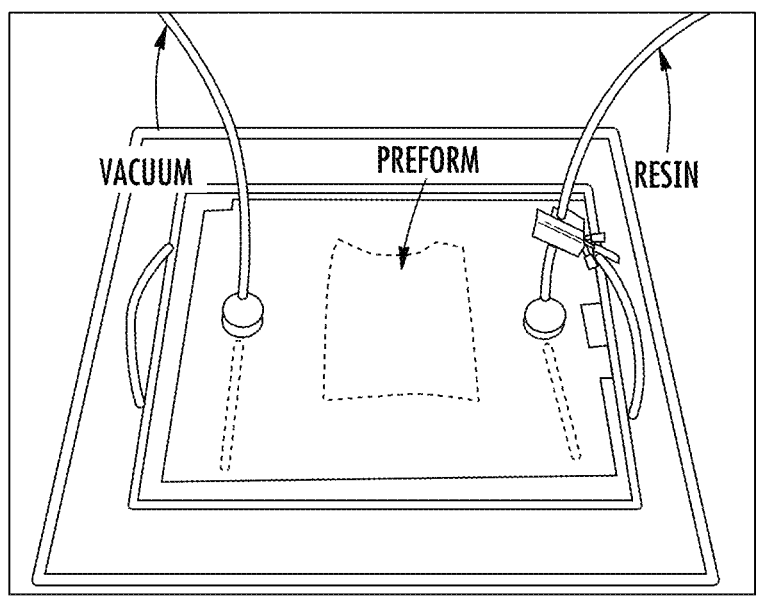
FIG. 2
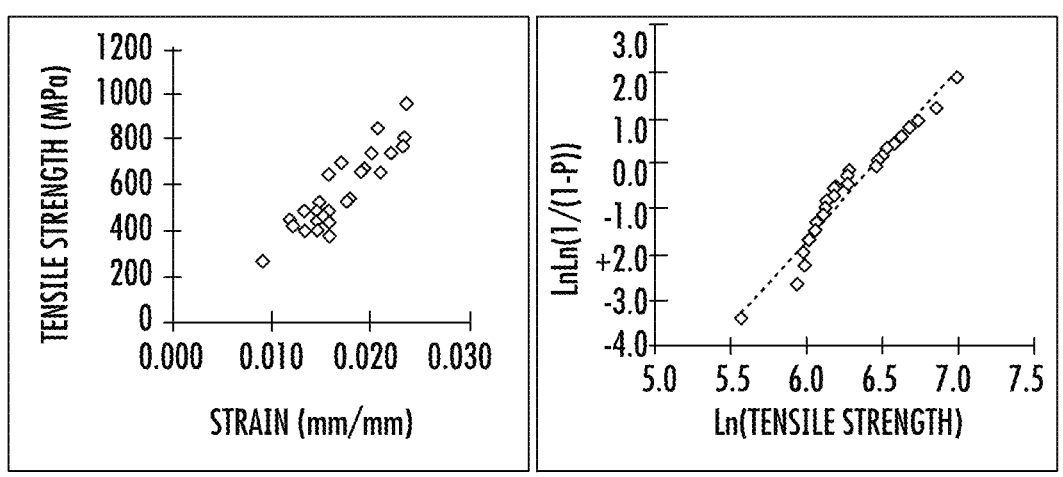
FIG. 3A
FIG. 3B

METHOD OF PRODUCING CARBON FIBERS AND CARBON FIBER COMPOSITES FROM PLANT DERIVED LIGNIN AND ITS BLENDS

RELATED APPLICATIONS

The presently disclosed subject matter claims priority to and the benefit of U.S. Provisional Patent Application Ser. No. 62/415,085, filed Oct. 31, 2016; the disclosure of which is incorporated herein by reference in its entirety.

TECHNICAL FIELD

The presently disclosed subject matter relates to lignin carbon fiber composites and to methods of producing the lignin carbon fiber composites. In some embodiments, the lignin used to prepare the lignin carbon fibers can be obtained from various plant sources and combinations of plant sources. The lignin carbon fiber composites can have desirable interfacial adhesion strength between the lignin carbon fibers and the surrounding polymeric matrix material of the composite and show non-explosive failure mechanisms.

BACKGROUND

Carbon fiber composites are of interest to a wide range of industries, such as the automotive industry, the aerospace industry, in sporting goods (e.g., fishing rods and golf clubs), and in the wind energy industry, due to their high strength to weight ratio. For example, carbon fiber reinforced polymers (CFRP) are of particular interest to the automotive industry due to recent U.S. legislation requiring increased fuel economies of 35.5 miles per gallon (mpg) in 2017 and 54.5 mpg in 2025. See "2017 and Later Model Year Light-Duty Vehicle Greenhouse Gas Emissions and Corporate Average Fuel Economy Standards," in Federal Register, 2012, U.S. Environmental Protection Agency, p. 62624-63200. It is estimated that CFRP's could reduce the weight of a car by 60%, which could dramatically increase fuel economy.

However, widespread use of carbon fiber has been limited by the high costs of precursor materials, processing and manufacture. Most carbon fiber used for commercial and industrial applications has come from petroleum-based precursors, such as polyacrylonitrile (PAN) and mesophase pitch (MPP). These precursors are relatively expensive, contributing to more than 50% of the manufacturing costs of a carbon fiber. Further, petroleum is not renewable or sustainable. In addition, carbon fibers also often require a surface treatment, e.g., sizing, which can add to overall processing time and cost, to increase the compatibility of the carbon fiber and the polymers that the carbon fibers are being used to reinforce.

Lignin, a biopolymer found in plant cell walls, has received attention as a replacement to typical carbon fiber precursors, such as PAN, due to its high carbon content, potential abundance, renewability, and potential low cost. See Baker and Rials, Journal of Applied Polymer Science, 2013, 130(2): 713-728; and Sudo and Shimizu, Journal of Applied Polymer Science, 1992, 44: 127-134. Lignin is a complex, three-dimensional network polymer, comprising aromatic alcohols with differing degrees of methoxy substitution based on the particular plant of origin. Lignin can be fractionated from lignocellulosic biomass, which also comprises cellulose and hemi-cellulose. Typically, about 20-30% of the total mass of lignocellulosic biomass is lignin.

The high aromatic carbon content of lignin and partially oxidized structure of lignin make it an attractive raw material for carbon fibers, particularly in view of its potential abundance, renewable nature and relatively low cost. However, because of lignin's irregular, unpredictable structure, the production of high quality lignin fibers can be challenging.

Accordingly, there is an ongoing need for carbon fiber composites that can be prepared from carbon fibers derived from less expensive and/or renewable sources, such as lignin carbon fiber, and for methods of making such carbon fiber composites and lignin carbon fibers that can be incorporated into the composites. There is also an on going need for carbon fiber composites with better interfacial properties between the carbon fiber and the surrounding polymer.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a carbon fiber reinforced polymer composite comprising: a polymeric matrix material; and a lignin carbon fiber embedded in the polymeric matrix material, optionally wherein the lignin carbon fiber is amorphous. In some embodiments, the composite has a non-explosive failure mechanism. In some embodiments, an interfacial shear strength (IFSS) between the lignin carbon fiber and the polymeric matrix material is higher than the IFSS would be between a non-lignin carbon fiber and the same polymeric matrix material.

In some embodiments, the lignin carbon fiber is free of a surface treatment or coating. In some embodiments, the composite comprises a plurality of oriented, continuous lignin carbon fibers or the composite comprises a chopped fiber composite and comprises a plurality of short lignin carbon fibers. In some embodiments, the lignin carbon fiber comprises lignin from a lignocellulosic feedstock material, wherein the lignocellulosic feedstock material is selected from a hardwood feedstock material, a softwood feedstock material, an annual feedstock material, a solvent extracted material, or a combination thereof. In some embodiments, the lignin carbon fiber is prepared by carbonizing a melt-spun lignin fiber at a temperature of about 1000° C.

In some embodiments, the polymeric matrix material comprises a thermosetting polymer. In some embodiments, the thermosetting polymer is an epoxy.

In some embodiments, the presently disclosed subject matter provides a method of preparing a carbon fiber reinforced polymer composite, the method comprising: (a) providing a lignin carbon fiber; and (b) embedding the lignin carbon fiber in the polymeric matrix material or a precursor thereof. In some embodiments, step (b) comprises placing the lignin carbon fiber in a mold; introducing a thermosetting or thermoplastic polymer resin into the mold, optionally wherein the polymer resin is an epoxy resin; and curing the polymer resin. In some embodiments, step (a) comprises: (i) providing a lignocellulosic feedstock material; (ii) treating the lignocellulosic feedstock material to provide an isolated lignin; (iii) melt-spinning the isolated lignin to provide a lignin fiber; (iv) thermostabilizing the lignin fiber to provide a thermostabilized lignin fiber; and (v) carbonizing the thermostabilized lignin fiber, to provide a lignin carbon fiber.

In some embodiments, the lignin feedstock material is a blend of a hardwood feedstock material and a softwood feedstock material and/or an annual feedstock material. In some embodiments, step (ii) comprises an organosolv pulping process. In some embodiments, the carbonizing of step (v) comprises heating the thermostabilized lignin fiber under an inert atmosphere from room temperature to about 1000° C. at a rate of about 10° C. per minute or less; and holding the temperature at about 1000° C. for a period of time.

In some embodiments, the isolated lignin provided by step (ii) has a glass transition temperature ($T_g$) of between about 107° C. and about 135° C. In some embodiments, the isolated lignin provided by step (ii) has a purity of about 95% or more.

In some embodiments, the lignin carbon fiber has a diameter of about 40 microns or less. In some embodiments, the lignin carbon fiber has a failure stress of about 250 MPa or more. In some embodiments, the composite has a tensile modulus of about 9 GPa and/or a failure stress of about 85 MPa.

It is an object of the presently disclosed subject matter to provide a composite comprising lignin carbon fibers and a polymeric matrix material and to provide methods of making the composites.

An object of the presently disclosed subject matter having been stated hereinabove, and which is achieved in whole or in part by the presently disclosed subject matter, other objects will become evident as the description proceeds when taken in connection with the accompanying drawings as best described herein below.

BRIEF DESCRIPTION OF THE DRAWINGS

FIG. 2 is a schematic drawing showing the experimental set-up for resin infusion using vacuum assisted resin transfer molding (VARTM). The set-up includes a vacuum bag in which a carbon fiber preform is placed. The bag contains an input for a polymer resin and a tube connected to a vacuum.

FIG. 3A is a graph showing failure stress (in megapascals (MPa)) versus strain (in millimeters per millimeter (mm.mm) for single switchgrass lignin carbon fiber composites.

FIG. 3B is a graph showing the Weibull distribution for the mechanical results of the single fiber composites. The Weibull parameters determined are a shape parameter of 3.66 and a scale parameter of approximately 630 MPa. Line equation for dashed line: y=3.6554x−23.576; $R^2$=0.9451.

DETAILED DESCRIPTION

Figure 1A:
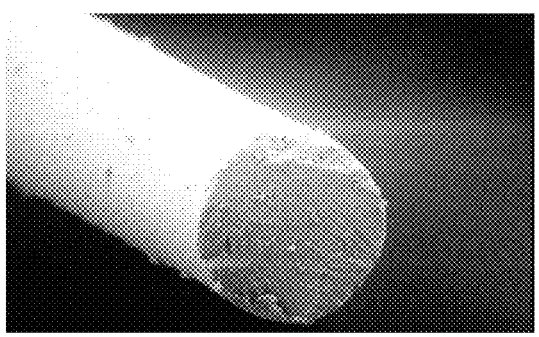
FIG. 1A is a scanning electron microscopy (SEM) micrograph of a single switchgrass lignin carbon fiber. The scale bar in the lower left-hand corner represents 2 microns (μm). Microscope settings: magnification=8,000 times; electron high tension (EHT)=5.11 kilovolts (kV); SE2 detector; working distance (WD)=5.8 millimeters (mm).
Figure 1B:
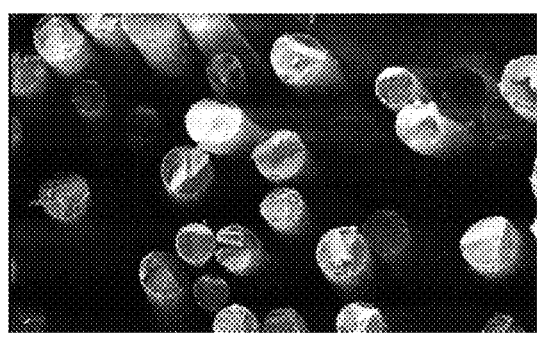
FIG. 1B is a scanning electron microscopy (SEM) micrograph of a cluster of switchgrass lignin carbon fibers showing the cross-sectional area of the fibers and void content. The scale bar in the lower left-hand corner represents 10 microns (μm). Microscope settings: magnification=2,000 times; electron high tension (EHT)=5.00 kilovolts (kV); SE2 detector; working distance (WD)=4.8 millimeters (mm).
Figure 1C:
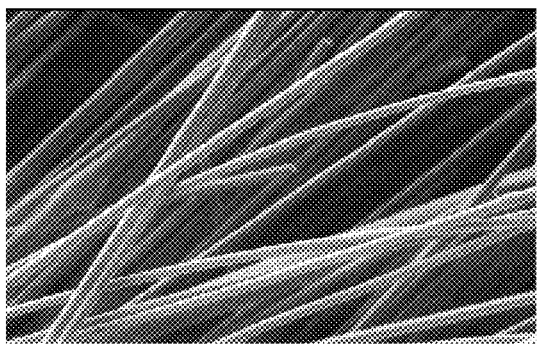
FIG. 1C is a scanning electron microscopy (SEM) micrograph showing the surface morphology of switchgrass lignin carbon fibers. The micrograph shows minimal defects. The scale bar in the lower left-hand corner represents 100 microns (μm). Microscope settings: magnification=500 times; electron high tension (EHT)=5.00 kilovolts (kV); SE2 detector; working distance (WD)=7.0 millimeters (mm).
Figure 1D:
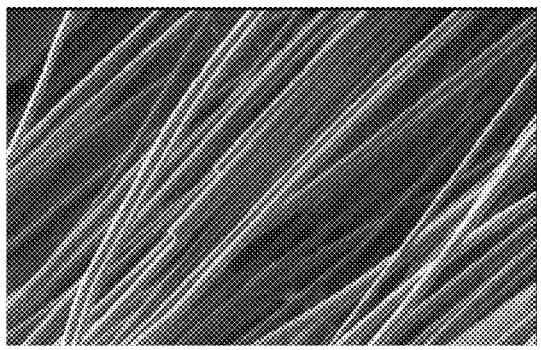
FIG. 1D is a scanning electron microscopy (SEM) micrograph showing the surface morphology of switchgrass lignin carbon fibers. The micrograph shows minimal defects. The scale bar in the lower left-hand corner represents 100 microns (μm). Microscope settings: magnification=500 times; electron high tension (EHT)=5.00 kilovolts (kV); SE2 detector; working distance (WD)=7.5 millimeters (mm).

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "a lignin carbon fiber" includes a plurality or mixture of fibers, and so forth.

Unless otherwise indicated, all numbers expressing quantities of size (e.g., length, width, diameter, thickness), volume, mass, force, strain, stress, time, temperature or other conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

The term "lignocellulosic" refers to a composition comprising both lignin and cellulose. In some embodiments, lignocellulosic material can comprise hemicellulose, a polysaccharide which can comprise saccharide monomers other than glucose. Lignocellulosic materials can also comprise additional minor components, such as non-structural phenolic compounds, fatty acids, glycerides, waxes, terpenes, and terpenoids.

Lignocellulosic biomass or "lignocellulosic feedstock material" includes a variety of plants and plant materials, such as, but not limited to, papermaking sludge; wood, and wood-related materials, e.g., saw dust, or particle board, leaves, or trees, such as poplar trees; grasses, such as switchgrass and sudangrass; grass clippings; rice hulls; bagasse (e.g., sugar cane bagasse), jute; hemp; flax; bamboo; sisal; abaca; hays; straws; corn cobs; corn stover; whole plant corn, and coconut hair. In some embodiments, lignocellulosic feedstock material is selected from the group including, but not limited to, herbaceous material, solvent extracted materials, agricultural residues, forestry residues, municipal solid wastes, waste paper, pulp and paper mill residues, biorefinery residues, residues from fuel production, or a combination thereof. In some embodiments, lignocellulosic feedstock material is selected from the group including, but not limited to, hardwood, softwood, an annual plant, or combinations thereof. In some embodiments, the lignocellulosic feedstock can be provided in an appropriate size, e.g., as chips or particles, as desired.

"Lignin" is a polyphenolic material comprised of phenyl propane units linked by ether and carbon-carbon bonds. Lignins can be highly branched and can also be crosslinked. Lignins can have significant structural variation that depends, at least in part, on the plant source involved.

The term "cellulose" refers to a polysaccharide of β-glucose (i.e., β-1,4-glucan) comprising β-(1-4) glycosidic bonds. The term "cellulosic" refers to a composition comprising cellulose.

The term "hemicellulose" can refer polysaccharides comprising mainly sugars or combinations of sugars other than glucose (e.g., xylose). Thus, xylan (polymerized xylose) and mannan (polymerized mannose) are exemplary hemicelluloses. Hemicellulose can be highly branched. Hemicellulose can be chemically bonded to lignin and can further be randomly acetylated, which can reduce enzymatic hydrolysis of the glycosidic bonds in hemicellulose.

The term "isolated lignin" as used herein refers to a composition substantially comprising (e.g., comprising about 90%, 95% 96%, 97%, 98% or 99% or more) lignin by mass isolated from a lignocellulosic feedstock material.

The term "lignin carbon fiber" refers to a carbon fiber containing carbonized lignin. The lignin carbon fiber can be prepared by spinning a fiber from lignin or a lignin-containing mixture. For example, in some embodiments, the fiber can be spun from a mixture of lignin and a synthetic polymer (e.g., polypropylene (PP), poly(ethylene glycol) (PEG), polyacrylonitrile (PAN), polyethylene terephthalate (PET), etc.). In some embodiments, the fiber is spun from a dope comprising lignin or a mixture of lignin from different lignocellosic feedstocks where the dope is free of any synthetic polymer and/or plasticizer.

The spinning can be done by any suitable spinning technique, e.g., wet, dry, dry wet-jet, melt, gel, or electro-spinning. In some embodiments, the spinning is done by melt-spinning. The "green" or "raw" lignin fiber produced by the spinning can then be stabilized (e.g., via a thermal and/or oxidative treatment) and carbonized. As used herein the term "lignin carbon fiber" can refer to carbon fibers comprising at least about 50%, 55%, 60%, 65%, 70%, 75%, 80%, 85%, 90%, or 95% carbonized lignin. In some embodiments, the lignin carbon fiber carbon content is 100% derived from lignin.

In some embodiments, the lignin carbon fiber is substantially amorphous (i.e., non-crystalline). The term "substantially amorphous" as used herein with regard to lignin carbon fibers can refer to a lignin carbon fiber having a XRD diffraction pattern that lacks a large, clear graphitic peak (e.g. lacks a clearly distinguishable peak at between about 20° and about 30° in a 2θ scan).

The term "thermoplastic" can refer to a polymer that softens and/or can be molded above a certain temperature, but is solid below that temperature. Thermoplastics include, but are not limited to, ethylene vinyl acetate (EVA), polyolefins, polyamides, polyesters, styrene block copolymers (SBCs), polycarbonates, silicone rubbers, fluoropolymers, thermoplastic elastomers, polypyrrole, polycaprolactone, and mixtures and/or combinations thereof.

The terms "thermoset" and "thermosetting" can refer to a polymer that is irreversibly formed when polymer precursors (e.g., monomers and/or oligomers) react with one another when exposed to heat, suitable radiation (e.g., visible or ultraviolet light), and/or suitable chemical conditions (e.g., the addition of a chemical polymerization initiator or catalyst (e.g. a peroxide) and/or exposure to suitable pH conditions (such as brought about by the addition of an acid or base)). In some embodiments, the thermoset polymer comprises a crosslinked polymer. Thermoset polymers include, but are not limited to, epoxys, polyurethanes cyanoacrylates, acrylic polymers (e.g., methacrylates) and mixtures and/or combinations thereof.

The term "resin" when used with regard to a thermosetting polymer can refer to a mixture of the polymer precursors.

The terms "cure", "curing", and "cured" as used herein can refers to the hardening of a thermoplastic adhesive or to the formation of a solid thermoset polymer from its precursors (e.g. via cross-linking of polymer chains in a thermoset polymer resin). Curing can be done thermally, chemically, or via application of ionizing radiation, such as but not limited to electron beam, x-ray, gamma, photo with photo initiators, and/or ultraviolet (UV)). In some embodiments, the "curing" and its variations refers to the curing of a thermoset adhesive.

The term "embedded" as used herein can refer to an object, such as a carbon fiber, being completely or partially enclosed within another material, such as a polymeric matrix. Generally, the term "embedded" is not intended to include covalent bonding of the object and the material in which it is embedded, but can include non-covalent interactions, such as hydrogen bonding.

The term "oriented" as used herein refers to a non-random arrangement of a plurality of lignin carbon fibers (e.g., a plurality of continuous lignin carbon fibers). The orientation of the fibers can be unidirectional (i.e., wherein all longitudinal axis of the fibers are all orientated in the same direction), bidirectional (wherein the longitudinal axis of some of the fibers is at a 90° angle to the axis of the other fibers), between a uni- and bidirectional orientation, or combinations thereof (e.g., where there are multiple layers of fibers of differing orientation).

The term "alcohol" generally refers to a compound comprising a —OH group. In some embodiments, the term alcohol refers to a water miscible alcohol, such as, but not limited to methanol, ethanol, n-propanol, isopropanol and tert-butanol. In some embodiments, the alcohol can be partially water soluble, e.g., sec-butanol, isobutanol, n-butanol, or pentanol.

The term "water-immiscible organic solvent" refers to carbon-containing molecules that are liquids (i.e., at room temperature or at the temperature of intended use) and that are immiscible with water, such as, but not limited to certain halides (e.g., carbon tetrachloride, chloroform, 1,2-dichloroethane, dichloromethane), ethers (e.g., diethyl ether, methyl t-butyl ether), ketones, esters (e.g., ethyl acetate), alkanes (e.g., hexane, heptane, pentane, 2,2,4-trimethylpentane), and aromatic compounds (e.g., toluene).

The term "ketone" generally refers to a compound comprising the structure R—C(=O)—R', wherein R and R' are independently alkyl, aralkyl, or aryl. In some embodiments, the term "ketone" as used herein refers to a water-insoluble or water-immiscible aliphatic ketone. The ketone can comprise, for example 4-10 carbon atoms. In some embodiments, the ketone can be selected from the group including, but not limited to, methyl ethyl ketone, methyl isopropyl ketone, methyl propyl ketone, methyl butyl ketone, methyl isobutyl ketone, methyl isoamylketone, diethyl ketone, ethyl isopropyl ketone, ethyl propyl ketone, ethyl isobutyl ketone, and mixtures thereof.

II. General Considerations

Figure 7A:
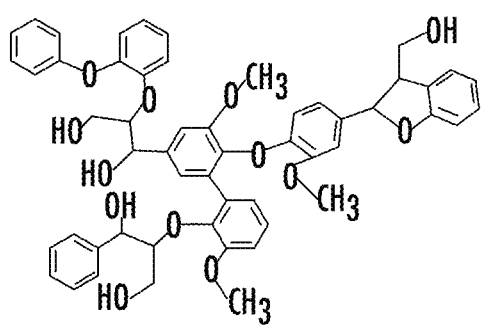
FIG. 7A is a schematic drawing of the chemical structure of a simplified lignin molecule.
Figure 7B:
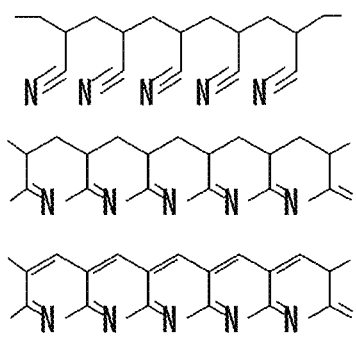
FIG. 7B is a schematic drawing of the chemical structure of a polyacrylonitrile (PAN) molecule (top) with steps showing its cyclization (middle) and dehydrogenation (bottom).
Figure 7C:
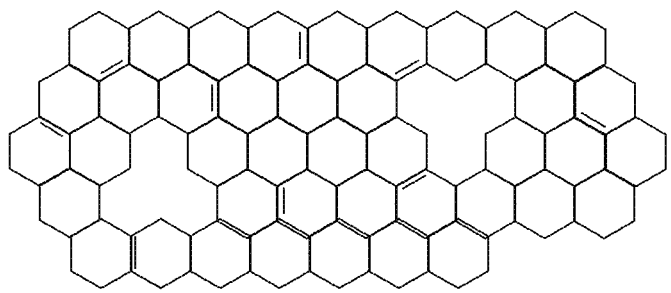
FIG. 7C is a schematic drawing showing the chemical structure of a simplified plane of a turbostratic graphitic crystallite.

Currently, the most popular feedstock (~90% of global production) for production of carbon fibers is polyacrylonitrile (PAN), which is derived from petroleum. PAN is a very regular (e.g., generally free of defects along the polymer chain) and linear polymer of high molecular weight. Typically, to produce carbon fiber, the PAN is dissolved in a solution termed a "dope" and extruded out of small holes into a bath where the solution swells, undergoes phase inversion, and creates a solid fiber. The high molecular weight of the polymer allows the fiber to be tensioned to align the polymer chains and reduce fiber voids. Ultimately this process (wet spinning) produces fibers that, once stabilized, can create a very ordered crystal structure when carbonized and subsequently graphitized at high temperatures. See FIGS. 7B and 7C. However, drawbacks of producing carbon fibers by this process can include high cost, low rate of production, and toxic byproducts.

Lignin, in contrast to PAN, is a naturally occurring class of polyphenolic polymers that occurs in plants. Lignin can have a complex, network structure that varies depending upon the plant source. See FIG. 7A. More particularly, the monomeric constituents of softwood lignin primarily comprise coniferyl alcohol, while hardwood lignin can contain high amounts of sinapyl alcohol and grasses can contain large amounts of coumaryl alcohol. The structures of these monomeric units are shown below in Scheme 1. Some of the more common monolignol inter-unit linkages (i.e., β-O-4, α-O-4, and 4-O-5) in lignin are identified in Scheme 2. The three main inter-unit linkages in plant cell wall lignin are aryl ether bonds. For example, in the lignin of softwoods, β-O-4, α-O-4 and 4-O-5 linkages occur in approximate percentages of 45-50, 6-8, and 4-8%, respectively. See Favier et al., New J. Chem., 2004, 28:62-66. Linkages at the 3- and 5-positions on the aromatic monomer unit are referred to as condensed linkages (i.e., 5-5, β-β, and dibenzodioxocin), and lead to a less linear chain conformation and more three-dimensional/fractal structure. Lignin is also chemically bonded to cell wall polysaccharides through lignin-carbohydrate complexes (LCCs). Though the exact nature of LCCs is not known, LCCs are suspected to be chemical labile bond types or cross-links, such as ferulates (i.e., ester bonds). See Fenael and Wegener, "Wood: Chemistry, Ultrastructure, Reaction," Walter de Gruyter, New York, 1984. During the production of lignin carbon fiber, these irregular structures are converted into a cyclic carbon structure.

Scheme 1. Exemplary Lignin Monomeric Units.

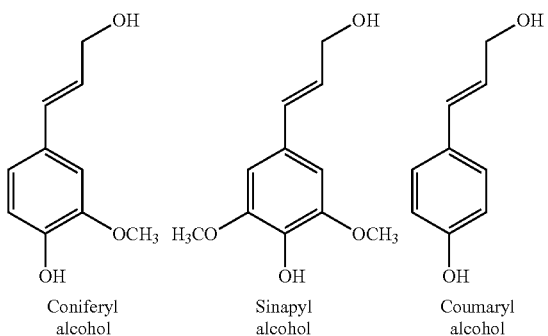

Coniferyl alcohol

Sinapyl alcohol

Coumaryl alcohol

Scheme 2. Primary Interunit Linkages Between Lignin Monomeric Units

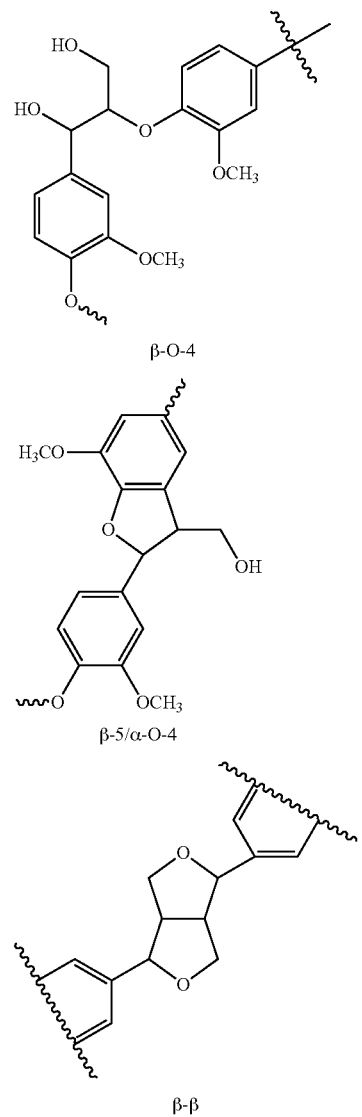

β-O-4

β-5/α-O-4

β-β

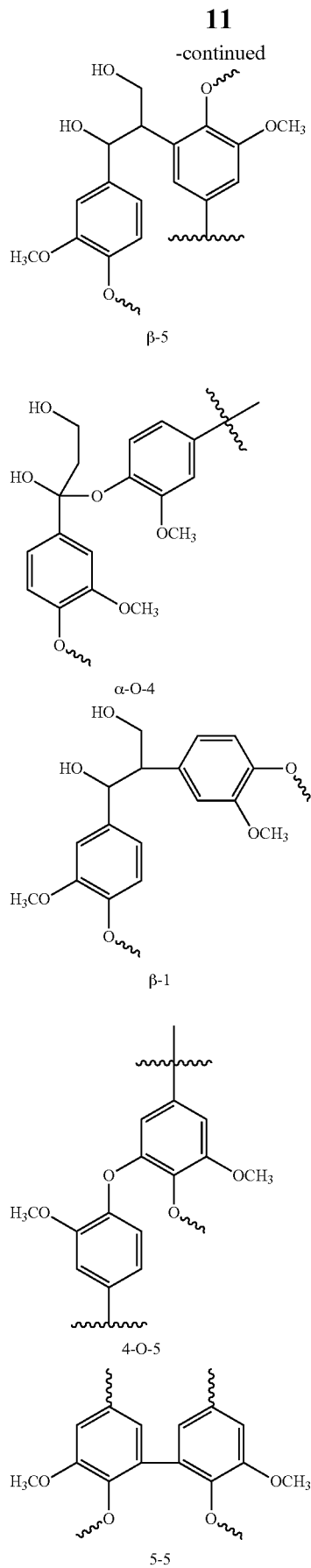

β-5

α-O-4

β-1

4-O-5

5-5

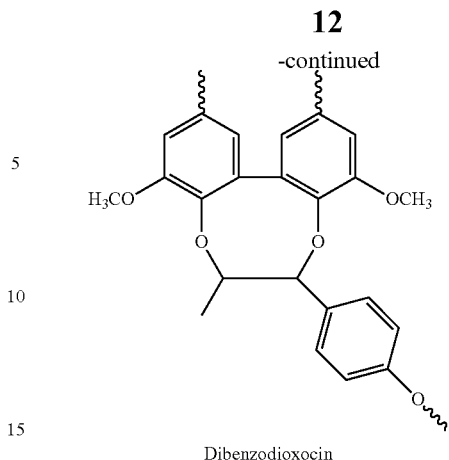

Dibenzodioxocin

Once lignin is isolated from other components of lignocellulosic biomass, it can be spun into a "raw" or "green" lignin fiber. In some embodiments, such as described further hereinbelow, the lignin can be melt spun, which is a relatively fast and cheap process compared to wet spinning. However, the green fiber can be relatively weak and brittle until further processing takes place. This further processing can include a thermo oxidation step to render the fibers infusible. This process can facilitate intra- and inter-molecular crosslinking to prevent shrinking, melting and fusing during subsequent carbonizations. The spun fibers can be heated in an environment containing oxygen at 250-300° C. at a controlled rate to prevent fiber fusing. Thermal processing of PAN can create cyanide gas. Lignin, in contrast, does not contain significant amounts of nitrogen and therefore, does not create this gas. Also, lignin is already partially oxidized and can be readily stabilized. Further processing can also include carbonization of the stabilized fiber. Carbonization can involve heating in an oxygen free environment up to 1400° C. During carbonization a series of condensation reactions can occur, causing an increase in carbon content and a reduction in hydrogen content. If desired, another heating step of up to 3000° C. can be performed to impart a more graphitic structure (e.g., for high-grade specialty fibers).

Because of lignin's irregular structure, the production of high quality lignin fibers can be challenging. As noted above, the structure of lignin can depend upon plant source and processing. Lignin can have a relatively low molecular weight compared to other materials for making carbon fibers and can depend upon secondary interactions to form fibers. Lignin carbon fibers can also have lower fiber strength during processing and lack of orientation. Further, pulping contaminates, e.g., inorganic impurities carbohydrates, and low molecular weight fractions, can cause defects in the fiber during processing.

Despite these potential challenges, in one aspect, the presently disclosed subject matter provides lignin carbon fiber composites with superior properties, such superior interfacial adhesion properties, as compared to composites prepared using commercially available carbon fibers derived from non-lignin carbon sources. Interfacial adhesion properties, such as interfacial shear strength (IFSS) can depend on various factors, including: (1) the mechanical properties of the fiber (e.g., modulus, continuity of strain, etc.; and (2) physical adhesion (e.g., from surface forces such as friction and mechanical interlock); and (3) chemical adhesion, such as from covalent and/or secondary force interactions. In composite design and performance, the adhesion between fiber and polymer matrix can be important to overall composite performance. The ability of the composite to transfer stress from the matrix to the fiber can be important, for instance, to achieving desirable mechanical properties.

The presently disclosed composites can also be prepared from lignin carbon fibers prepared via a variety of spinning techniques, e.g., via wet, dry, wet-jet, melt, gel, or electrospinning, and/or from lignin from a single plant source, a mixture of plant sources, or a fiber containing at least 50% lignin components that have been blended or modified. For instance, in some embodiments, the composites can be prepared from lignin carbon fibers containing 100% switchgrass lignin. In some embodiments, composites can be prepared using unsized lignin carbon fibers.

Accordingly, the presently disclosed subject matter provides carbon fiber composites, particularly for those applications wherein high interfacial strength/adhesion is useful, that can be provided using fibers or both fibers and matrix produced using renewable materials, and/or that use fibers that can be produced less expensively, faster, and with fewer toxic side-products than traditional carbon fibers prepared from synthetic carbon sources, such as PAN or mesophase pitch. For example, the presently disclosed composites can be used for producing various automotive components where structural performance is not particularly critical and/or has lower requirements, such as in body panels, interior panes, brakes, rotors, bumpers, seats, and steering wheels.

III. Carbon Fiber Composites

In some embodiments, the presently disclosed subject matter provides a carbon fiber composite comprising a lignin carbon fiber embedded in a polymeric matrix. In some embodiments, the lignin carbon fiber is a substantially amorphous carbon fiber. The lignin carbon fiber can be a short fiber or a continuous carbon fiber. In some embodiments, the composite can comprise a plurality of lignin carbon fibers. In some embodiments, the composite can comprise a plurality of lignin-based carbon fibers and non-lignin carbon fibers. For example, the composite can comprise a plurality of short, randomly arranged (non-oriented) fibers, such as a chopped carbon fiber composite. Alternatively, in some embodiments, the composite can comprise a plurality of continuous fibers (e.g., a plurality of continuous lignin carbon fibers or a mixture of continuous lignin carbon fibers and continuous non-lignin carbon fibers). In some embodiments, the plurality of continuous fibers can be oriented, e.g., unidirectionally or bidirectionally. The lignin carbon fiber can have good interfacial properties. The composites formed from the lignin carbon fibers can have superior failure mechanisms as compared to other carbon fiber composite materials, even in the absence of sizing agents.

In some embodiments, the lignin carbon fiber is unsized and/or is otherwise free of a post-carbonization surface coating or treatment. In some embodiments, the interfacial shear strength (IFSS) between the lignin carbon fiber and the polymer matrix can be between about 7 MPa or greater, e.g., between about 7 MPa and about 23.3 MPa, even in the absence of the sizing or other surface treatment. In some embodiments, the composite can have a higher IFSS than a corresponding composite comprising a non-lignin carbon fiber and the same polymeric matrix material. In some embodiments, the IFSS between the lignin carbon fiber and the polymer matrix is at least about 10.5 MPa, at least about 15.0 MPa or at least about 20.0 MPa.

In some embodiments, the composite displays a non-explosive failure mode, such as a lateral or angled brittle failure mode. In some embodiments, the average fiber fragmentation length upon single fiber fragmentation testing of the composite is less than about 500 μm, less than about 450 μm, less than about 400 μm, less than about 350 μm, less than about 300 μm, less than about 250 μm, less than about 200 μm, less than about 150 μm, or less than about 100 μm.

The lignin carbon fiber can comprise lignin from any suitable lignocellulosic feedstock. For example, the lignocellulosic feedstock material can be selected from a hardwood feedstock material, a softwood feedstock material, an annual feedstock material, a solvent extracted material (i.e., a solvent extracted lignocellulosic material of hardwood, softwood, or annual feedstock origin), or a combination thereof. In some embodiments, the lignocellulosic feedstock is a solvent extracted plant material. In some embodiments, the lignocellulosic feedstock material can comprise a grass (e.g., switchgrass. In some embodiments, the lignocellulosic feedstock can comprise a hardwood, e.g., poplar. In some embodiments, the lignin can be from a combination or a grass (e.g., switchgrass) and a hardwood (e.g., poplar).

In some embodiments, the lignin carbon fiber is free of a carbon from a non-lignin source and/or a plasticizer. In some embodiments, the lignin carbon fiber contains 100% lignin-derived carbon. Alternatively, in some embodiments, the lignin carbon fiber can contain a mixture of lignin-derived carbon and carbon from another source, e.g., a synthetic polymer or pitch. In some embodiments, the lignin can be chemically modified and/or blended with other materials (e.g., plasticizers).

To prepare the lignin carbon fiber, the lignin can be isolated from the lignocellulosic feedstock using any suitable process. The process can be a pulping or an extraction method. In some embodiments, the lignin is from the residues of a fuel or chemical production process. In some embodiments, the lignin can be isolated from the lignocellulosic feedstock using a pulping process, i.e., a process known from the paper industry for breaking the linkages between cellulose, hemicellulose and lignin, such as, but not limited to organosolv pulping, kraft pulping, a sulfite pulping process, a steam explosion process. For example, the pulping process can be kraft pulping, wherein a lignocellulosic feedstock is treated with a mixture of water, sodium hydroxide and sodium sulfide (i.e., "white liquor").

In some embodiments, the lignin can be isolated from the lignocellulosic feedstock via an organosolv process, such as that described in U.S. Pat. No. 5,730,837, herein incorporated by reference in its entirety. Briefly, the organsolv process can comprise treating a lignocellulosic feedstock with a mixture of alcohol, water, and a water-immiscible organic solvent at elevated temperature. After a period of time, the mixture is adjusted to cause phase separation and lignin can be isolated from the organic phase. A modified organosolv process designed to improve the yield and/or purity of lignin from lignocellulosic biomass is described in WO 2016/033456, incorporated by reference herein in its entirety.

In some embodiments, the lignin carbon fiber is spun via a continuous spinning method, such as melt spinning (or wet, dry, dry wet-jet, melt, or electrospinning), thermostabilized and carbonized. Thus, in some embodiments, the lignin carbon fiber is a carbonized melt-spun lignin fiber. To reduce the fiber diameter of the originally spun fiber, the fiber can be drawn at a suitable draw rate and/or via tensioning during stabilization of the green fiber. Stretching of the fibers (e.g., stabilizing the fibers under tension) can reduce defects in the fibers and provide rounder, more homogeneous fibers. The carbonization temperature of the fiber can be any suitable temperature. For example, carbonization of the spun lignin carbon fiber can be done at a temperature of up to about 2000° C., to provide higher strength fibers. In some embodiments, the temperature of carbonization of the fiber can be selected to optimize strength while keeping surface defects (e.g., pores) at a minimum. In some embodiments, the carbonization temperature is between about 800° C. and about 1400° C. In some embodiments, the carbonization temperature is about 1000° C.

In some embodiments, the lignin carbon fibers can be substantially free of surface defects and/or have a regular circular cross-section. In some embodiments, the lignin carbon fibers can have a diameter of about 40 microns or less. In some embodiments, the diameter can be between about 2 microns and about 22 microns or between about 7 microns and about 22 microns (e.g., about 7, 8, 9, 10, 11, 12, 13, 14, 15, 16, 17, 18, 19, 20, 21, or 22 microns).

In some embodiments, the lignin carbon fiber has a modulus of between about 28 GPa and about 40 GPa (e.g., about 28, 29, 30, 31, 32, 33, 34, 35, 36, 37, 38, 39, or about 40 GPa). In some embodiments, the lignin carbon fiber can have a modulus higher than 40 GPa. In some embodiments, the lignin carbon fiber has a modulus of up to about 50 GPa, about 55 GPa, about 60 GPa, about 65 GPa, about 70 GPa, about 75 GPa or about 80 GPa. In some embodiments, the lignin carbon fiber has a failure stress of between about 250 MPa and about 610 MPa (e.g., about 250, 300, 350, 400, 450, 500, 525, 550, 560, 570, 580, 590, 600, or 610 MPa). In some embodiments, the lignin carbon fiber has a failure stress that is higher than about 610 MPa. In some embodiments, the lignin carbon fiber failure stress is up to about 0.8 GPa, about 0.9 GPa, about 1.0 GPa, about 1.1 GPa, about 1.2 GPa, or about 1.3 GPa. In some embodiments, the lignin carbon fiber has a modulus of about 35 GPa or higher and a failure stress of about 580 MPa or greater (e.g., about 580, 585, 590, 595, or about 600 MPa or greater).

The lignin carbon fiber composites of the presently disclosed subject matter can comprise any suitable polymer, such as any suitable thermoset or thermoplastic polymer, or combination thereof, as the polymeric matrix material. Suitable thermoplastic polymers can include, but are not limited to, polyester, vinyl ester, and nylon. In some embodiments, the polymeric matrix material is thermosetting polymer, such as, but not limited to an epoxy, a vinyl ester, or a polyester. In some embodiments, the polymeric matrix is an epoxy. In some embodiments, the polymeric matrix material can also be derived from or partially from a renewable source. In some embodiments, the polymeric matrix material is formed by curing a resin comprising a bio-based carbon material, e.g., an epoxidized pine oil or other epoxidized plant derived oil. In some embodiments, the resin can contain at least about 20%, at least about 25%, at least about 30%, at least about 35% or at least about 40% bio-based carbon material.

In some embodiments, the lignin carbon fiber can be provided in the form of a woven or non-woven mat or fabric or in combinations thereof. In some embodiments the lignin carbon fiber can be provided in a plurality of layers of mats, fabrics, or layups of the same or differing orientation. Thus, the composite can comprise a plurality of continuous carbon fibers that can be unidirectional, bidirectional, have some intermediate directionality, or combinations thereof (e.g., contain some layers that are unidirectional and some that are bidirectional). In some embodiments, the plurality of continuous carbon fibers can have an orientation that is somewhere between uni- and bi-directional (e.g., have some fibers at a 45° angle to other fibers). In some embodiments, the lignin carbon fiber or fiber composite can be provided in the form of a tape. In some embodiments, the composite can be prepared from one or more lignin carbon fiber-containing prepregs or layups (e.g., 0, 45, or 90 degree layups). In some embodiments, the lignin carbon fiber composite can be formed using filament winding, open molding, pultrusion, reusable bag infusion, compression molding, resin transfer molding (RTM) or vacuum assisted resin transfer molding (VARTM).

In some embodiments, the presently disclosed composites can include another type of fiber, i.e., in addition to the lignin carbon fiber. The other fibers can be selected from the group including, but not limited to, aramid, glass, ultra high molecular weight polyethylene (UHMWPE), PAN or pitch-based carbon fibers, or aluminum. In some embodiments, the composite can include an additive, such as, but not limited to silica, rubber, carbon nanotubes, a coloring agent, etc.

IV. Methods of Preparing Lignin Carbon Fiber Composites

In some embodiments, the presently disclosed subject matter provides a method of preparing a carbon fiber reinforced polymer composite comprising a lignin carbon fiber. The method can comprise: (a) providing a lignin carbon fiber; and (b) embedding the lignin carbon fiber in a polymeric matrix material or a precursor thereof.

The "embedding" of step (b) can comprise any suitable method of introducing a carbon fiber into a polymer typically employed in the art of carbon fiber reinforced polymer composites. In some embodiments, the lignin carbon fiber can be placed between components comprising a thermoplastic resin and the thermoplastic resin can be heated to conform to the fiber. In some embodiments, step (b) can comprise contacting at least one face of the lignin carbon fiber with a resin for a thermosetting polymer and curing the resin (e.g., via adding a chemical cross-linker, via heating, and/or via application of UV radiation). In some embodiments, step (b) comprises placing the lignin carbon fiber in a mold; introducing a thermosetting or thermoplastic polymer resin into the mold, and curing the polymer resin. In some embodiments, the polymer resin is a thermosetting epoxy resin. In some embodiments, step (b) comprises performing vacuum assisted resin transfer molding (VARTM). In some embodiments, the lignin carbon fiber placed in the mold can be oriented, e.g., provided in the form of a uni- and/or bi-directional mat. In some embodiments, a plurality of lignin carbon fibers (e.g., short lignin carbon fibers) can be embedded in the matrix in a random orientation.

In some embodiments, the lignin carbon fiber can be provided by: (i) providing a lignocellulosic feedstock material; (ii) treating the lignocellulosic feedstock material to provide an isolated lignin; (iii) spinning the isolated lignin to provide a lignin fiber; (iv) thermostabilizing the lignin fiber to provide a thermostabilized lignin fiber; and (v) carbonizing the thermostabilized lignin fiber. Any suitable spinning technique can be used. In some embodiments, the spinning is performed by a continuous spinning technique, such as melt-spinning, wet spinning, dry spinning, dry wet jet spinning, melt spinning, gel spinning, or electrospinning. In some embodiments, the lignin carbon fiber contains at least 50% lignin components that have been blended or chemically modified.

Any suitable lignin feedstock material can be used, e.g., any hardwood, softwood, or annual feedstock material. In some embodiments, the feedstock material can be a solvent extracted material. The feedstock material can be a single feedstock material or a combination of feedstock materials.

In some embodiments, the feedstock material comprises a hardwood feedstock material combined with a softwood and/or annual feedstock material. In some embodiments, the lignin feedstock material comprises switchgrass, poplar, or a combination thereof.

Lignin can be isolated from the feedstock material by any suitable method (e.g., any suitable pulping or extraction process). In some embodiments, the isolation can be done via an organosolv pulping process, such as described hereinabove and in WO 2016/033456. Thus, in some embodiments, isolating the lignin comprises contacting the lignocellulosic feedstock material with a mixture comprising an organic solvent, an alcohol, and water in the presence of an acid at a first temperature for a first period of time; separating the mixture into an organic and an aqueous phase, and drying the organic phase to provide an isolated lignin. In some embodiments, the organic solvent is a water immiscible ketone, such as MIBK, or another water immiscible aliphatic ketone as described above. In some embodiments, the alcohol is ethanol. The acid can be selected from, for example, sulfuric acid, phosphoric acid, citric acid, nitric acid or any other suitable acid. In some embodiments, the acid is sulfuric acid.

In some embodiments, the mixture comprises about 7% to about 65% by weight of the ketone. In some embodiments, the mixture comprises about 25% to about 35% by weight alcohol. In some embodiments, the mixture has a ketone:alcohol:water ratio of about 16:34:50 by weight. In some embodiments, the mixture comprises between about 0.025 M and about 0.15 M acid. In some embodiments, the mixture comprises about 0.05 M of the acid.

In some embodiments, the first temperature is between about 130 and about 170° C. In some embodiments, first temperature is about 140° C. or about 160° C. In some embodiments, the first period of time is between about 60 minutes and about 180 minutes (e.g., about 60, 70, 80, 90, 100, 110, 120, 130, 140, 150, 160, 170, or about 180 minutes). In some embodiments the first period of time is about 120 minutes. In some embodiments, separating the organic and aqueous phases comprises adding a salt.

In some embodiments, the drying is performed in a rotary evaporator or a spray dryer. In some embodiments, the isolated lignin is dried in a vacuum oven, optionally under heating at a temperature of about 180° C. or less (e.g., at a temperature of between about 150° C. to about 180° C. or of between about 160° C. to about 180° C.). In some embodiments, the isolated lignin is melted, extruded, pelletized and dried in a vacuum oven prior to spinning.

In some embodiments, e.g., to improve the melt spinning ability of the lignin (e.g., by improving the melt flowability of the lignin), for example when the lignin feedstock is an annual feed stock, such as switchgrass (e.g., 100% switchgrass), the originally isolated lignin is dissolved in an alcohol, such as methanol, separated from any insoluble materials, and then dried to remove the alcohol.

The isolated lignin should have suitable properties for spinning. For instance, the isolated lignin should be able to withstand heating in an extruder for about 30 minutes without significant chemical degradation. In some embodiments, the isolated lignin has a glass transition temperature ($T_g$) of between about 107° C. and about 140° C. In some embodiments, the $T_g$ is less than about 130° C. or less then about 135° C. (e.g., is about 107, 108, 109, 110, 111, 112, 113, 114, 115, 116, 117, 118, 119, 120, 121, 122, 123, 124, 125, 126, 127, 128, 129, 130, 131, 132, 133, 134, or about 135° C.). In some embodiments, the $T_g$ is between about 120° C. and about 129° C. or 130° C. In some embodiments, the isolated lignin has melt flow temperature ($T_m$) between about 115° C. and about 195° C. In some embodiments, the $T_m$ is between about 140° C. and about 160° C. (e.g. about 140, 142, 144, 146, 148, 150, 152, 154, 156, 158, or about 160° C.). In some embodiments, the isolated lignin has a purity of about 95% or more. In some embodiments, the isolated lignin has a purity of about 98% or more.

In some embodiments, the isolated lignin is melt-spun. The melt-spinning can be performed at a temperature between about 150 and about 210° C. In some embodiments, the melt-spinning can be performed at a temperature varying between about 150 and about 190° C. (e.g., at about 150, 155, 160, 165, 170, 175, 180, 185, or about 190° C.). In some embodiments, the fiber is drawn through an orifice having a diameter of between about 120 and about 200 microns. In some embodiments, the raw melt-spun fiber is collected on a winder at a take-up speed of about 300 meters per minute (m/min) or at another suitable take-up speed to aid in orientation of the raw fibers and/or provide suitably efficient production of raw fiber.

Thermostabilizing the raw lignin fiber can be performed by heating the lignin fiber, optionally under tension, from room temperature to about 250° C. under air or in another oxygen containing environment at a first rate, and holding the sample at about 250° C. for a second period of time. In some embodiments, the first rate is between about 0.017 to about 0.1° C. per minute. In some embodiments, the first rate is between about 0.02° C. and about 0.05° C. per minute (e.g., about 0.02, 0.03, 0.04, or about 0.05° C./min). In some embodiments the second period of time is about 30 minutes. When the fiber is stabilized too quickly, the fiber can deform. If the fiber is stabilized too slowly, the mechanical properties of the fiber can be reduced and the cost of the process will be higher.

Carbonization of the thermostabilized fibers can comprise heating the thermostabilized lignin fiber under an inert atmosphere (e.g., argon, nitrogen, etc.) from room temperature to about suitable carbonization temperature (e.g. between about 2000° C. and about 800° C.) at a second rate. In some embodiments, the carbonization temperature is about 1000° C. In some embodiments, the second rate is about 10° C. per minute or less. In some embodiments the second rate is between about 3° C. and about 3.8° C. per minute. The fibers are held at the carbonization temperature (e.g., at about 1000° C.) for a third period of time. In some embodiments the third period of time is about 15 minutes or more.

In some embodiments, the lignin carbon fibers can be substantially free of surface defects and/or have a regular circular cross-section. In some embodiments, the lignin carbon fibers can have a diameter of about 40 microns or less. In some embodiments, the diameter can be between about 2 microns and about 22 microns or between about 7 and about 22 microns (e.g., about 7, 8, 9, 10, 11, 12, 13, 14, 15, 16, 17, 18, 19, 20, 21, or 22 microns).

In some embodiments, the lignin carbon fiber has a modulus of between about 28 GPa and about 40 GPa (e.g., about 28, 29, 30, 31, 32, 33, 34, 35, 36, 37, 38, 39, or about 40 GPa). In some embodiments, the lignin carbon fiber can have a modulus that is about 36 GPa or more. In some embodiments, the lignin carbon fiber can have a modulus higher than 40 GPa. In some embodiments, the lignin carbon fiber has a modulus of up to about 50 GPa, about 55 GPa, about 60 GPa, about 65 GPa, about 70 GPa, about 75 GPa or about 80 GPa. In some embodiments, the lignin carbon fiber has a failure stress of about 250 MPa or more. In some embodiments, the lignin carbon fiber has a failure stress of between about 250 MPa and about 610 MPa (e.g., about 250, 300, 350, 400, 450, 500, 525, 550, 560, 570, 580, 590, 600, or 610 MPa). In some embodiments, the lignin carbon fiber has a failure stress that is higher than about 610 MPa. In some embodiments, the lignin carbon fiber failure stress is up to about 0.8 GPa, about 0.9 GPa, about 1.0 GPa, about 1.1 GPa, about 1.2 GPa, or about 1.3 GPa. In some embodiments, the lignin carbon fiber has a modulus of about 35 GPa or higher and a failure stress of about 580 MPa or greater (e.g., about 580, 585, 590, 595, or about 600 MPa or greater). In some embodiments the lignin carbon fiber has a strain at break of between about 0.74% and about 1.60%.

If desired, the lignin carbon fiber can be sized prior to incorporation into the composite or treated with a suitable surface treatment. However, in some embodiments, the lignin carbon fiber is not coated or surface-treated. Even in the absence of sizing or surface treatment, the composites prepared according to the presently disclosed methods can have an interfacial shear stress (IFSS) between the lignin carbon fiber and the polymeric matrix material in the prepared composite of about 7 MPa or greater (e.g., between about 7 MPa and about 23.3 MPa). In some embodiments, the IFSS is greater than about 10.5 MPa or is greater than the IFSS would be between a non-lignin carbon fiber and the same polymeric matrix material. In some embodiments, the IFSS is greater than about 15 MPa or greater than about 20 MPa.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Synthesis and Characterization of Switchgrass Lignin Carbon Fiber and Composites Lignin Biomass and Fiber Production:

Lignin from Alamo switchgrass (*Panicum virgatum*) was isolated as previously described. See, e.g., Bozell et al., Biomass and Bioenergy, 2011, 35(10): 4197-4208. Briefly, the biomass was treated in a flow through reactor with a 16:34:50 wt % mixture of methyl isobutyl ketone (MIBK), ethanol, and water in the presence of sulfuric acid (0.05 M) at a temperature of 140° C. or 160° C. for 120 minutes. The aqueous and organic phases were separated. The organic phase was washed with water and dried and the residue was triturated with diethyl ether and washed with water. The diethyl ether was filtered and dried in a vacuum oven at 80° C. for 12 hours.

The ash content (0.12%) and purity (98.1%. acid soluble plus acid insoluble lignin) was determined using standard methods. See Sluiter et al., "Determination of Structural Carbohydrates and Lignin in Biomass. Laboratory Analytical Procedure (LAP)," National Renewable Laboratory, 2008; and Sluiter et al., Determination of Ash in Biomass. Laboratory Analytical Procedure (LAP)," National Renewable Laboratory, 2008. Lignin melt flow temperature ($T_m$) was determined optically using a Fisher-Johns melting point apparatus and thermal decomposition of the lignin was measured using a PerkinElmer Pyris 1 thermogravimetric analyzer (TGA) (PerkinElmer, Inc., Waltham, Mass., United States of America). The lignin had a zero shear melt flow temperature ($T_m$) of ~170° C. observed and a glass transition temperature ($T_g$) of 109° C. TGA results demonstrated that the lignin biomass contained an average of 6% moisture and began degrading in the 230-260° C. range.

Switchgrass lignin was melt-spun into fiber form using a pilot scale single-screw, pressure-controlled extruder (Alex James and Associates, Inc., Greer, S.C., United States of America), with temperature being varied along the extruder barrel starting at 150° C. to 180° C. at the die and optimized for a residence time on the order of several minutes. Initially, the lignin was pelletized using a 19 mm diameter extruder attached to a metering pump with a 15 mm orifice. Extrudate was quite brittle and pelletized before final extrusion into spun fibers. Pellets were dried in a vacuum oven at 80° C. and 560 mmHg for 12 hours and subsequently melt-spun into fibers using a spinneret with twelve 150 µm diameter holes. Extruded green fibers (15-35 µm in diameter) were collected onto a winder at a take-up speed 300 m/min. The lignin fibers were mounted on steel meshes and placed in a programmable convection oven and oxidatively stabilized using a rate of 0.02° C./min up to 250° C. Stabilized fibers were transferred to a carbonization furnace where they were carbonized in a nitrogen environment at 3° C./min to 1000° C. and held for 15 minutes. The produced carbon fibers possessed a near circular cross-section and were relatively defect free based on observations using scanning electron microscopy at various locations along the length of the fiber. See FIGS. 1A-1D. The average fiber diameter was 16.3 µm with a standard deviation of 5.7 µm.

Carbon Fiber Reinforced Composite Panel Manufacturing:

Super Sap Epoxy resin (Entropy Resins, Gardena, Calif., United States of America), comprising epoxidized pine oils, was used as the matrix resin for carbon fiber composite panels. This resin has a large biomass content (37% biobased carbon content from pine-based feedstocks) relative to other commercially available epoxies, thus providing high biomass and sustainable composites.

Carbon fiber composites composed of 6 piles, approximately 13 cm×13 cm square, were produced using a modified Vacuum Assisted Resin Transfer Molding (VARTM) process. The present process used double resin flow nettings and double vacuum bags. Unidirectional mats were placed in a preform inside a VARTM system (see FIG. 2) and produced into a composite. Composite samples were then trimmed and cut to lengths for evaluating mechanical properties according to ASTM D3039.

Single Carbon Fiber Mechanical Characterization:

The mechanical properties of the single carbon fibers were determined using a MTS Bionix Nano-Universal Testing Machine (Nano UTM) (MTS Systems Corporation, Eden Prairie, Minn., United States of America) equipped with custom grips specifically designed to test single fibers. The Nano UTM has high accuracy and resolution, as well as an ability to measure static and dynamic properties. Accuracy is maintained by a rigorous set of internal electronic and mechanical calibrations before testing. The resolution for measuring load and displacement are on the order of a nN and a nm, respectively. Nano UTM offers the ability to obtain monotonic stress-strain data while continuously measuring the complex modulus as a function of applied tensile strain with a nano-mechanical actuating transducer (NMAT). See Kant and Penumadu, Composites Part A: Applied Science and Manufacturing, 2014, 66:201-208.

Single fibers were observed using optical microscopy to obtain a diameter measurement prior to testing on the UTM. After evaluating tensile properties for a representative batch of single fibers (typically 20 to 25), a two-parameter Weibull distribution was employed to obtain the shape and scale parameters associated with the tensile behavior of the carbon fibers and used in the derivation of the interfacial shear strength (IFSS). See Kluq and Alexander, "X-Ray Diffraction Procedures for Polycrystalline and Amorphous Materials," 1974.

Composite Mechanical Characterization:

The produced composite was mechanically tested using a servo-hydraulic testing system (MTS-810; MTS Systems Corporation, Eden Prairie, Minn., United States of America) equipped with a 5 kip load cell at a rate of 0.5 mm/min. Tensile test samples are prepared and tested according to relevant composite ASTM standards. During the deformation of the composite sample, a digital image correlation (DIC) system was used to obtain local spatial variation of axial strains associated with potential heterogeneities in composite layup and processing. The DIC system had 50 micro-strain resolution at 1 Hz using dual 29 mega-pixel cameras from Correlated Solutions (Columbia, S.C., United States of America).

Fiber/Resin Interface Characterization:

Interfacial properties were determined using single fiber fragmentation testing (SFFT) on a single filament composite (SFC) where a single carbon fiber is embedded in a dogbone sample of resin. See Klug and Alexander, "X-Ray Diffraction Procedures for Polycrystalline and Amorphous Materials," 1974. SFFT was completed using a micro-load custom frame to apply tension to the SFC while observing fiber fractures in the composite in-situ under polarized microscopy.

Using the custom developed load frame for SFFT, fiber fractures and their evolution under high magnification and polarized light were observed until saturation was reached in a systematic and consistent fashion. The broken fiber lengths and delamination zones are measured at saturation in-situ. From the fiber lengths, the interfacial shear strength (IFSS) is determined using Equation 1:

$$\tau_{IFSS} = (\sigma_f * d)/2 * I_c) \qquad [1]$$

where $\tau_{IFSS}$ is the interfacial shear strength, $\sigma_f$ is the tensile strength at given gauge length, d is the fiber diameter, and $I_c$ is the critical fiber length.

Wide Angle X-Ray Diffraction:

Wide Angle X-Ray diffraction (WAXS) was completed on a Philips X'Pert XRD Diffractometer (PANalytical, Almelo, the Netherlands) to evaluate the structure of the carbon fiber. Parameters of interest to the lignin based carbon fibers include the peak positions corresponding to basal atomic planar spacing, the stacking height of the turbostratic graphitic planes (Lc), the crystallite size (La), and orientation of the planes with respect to the axis of the fiber, as these are all useful for determining structure-property relationships in PAN based carbon fibers. The basal plane d-spacings of interest are the (002) and (100), as these can indicate the crystallite parameters. Although normally the Lc and La are determined as well, the presently disclosed lignin carbon fiber showed little crystallinity. Thus, these parameters were not considered.

Single Fiber Mechanical Results:

The single carbon fibers possessed an average failure stress of ~590 MPa and a tensile modulus of ~35 GPa. See Table 1, below. Compared to previous lignin based carbon fiber studies (see Baker and Rials, Journal of Applied Polymer Science, 2013, 130(2):713-728), the presently disclosed organosolv lignin fibers based on switchgrass feedstock have favorable mechanical performance.

TABLE 1

Average Single Fiber Mechanical Properties

| # of tests | Diameter (μm) | Modulus (GPa) | Failure Strain (mm/mm) | Failure Stress (MPa) |
|---|---|---|---|---|
| 27 | 16.2 ± 6.0 | 35.1 ± 6.1 | 0.017 ± 0.004 | 587 ± 192 |

The presently disclosed fiber samples displayed a relatively large variation in diameter due to difficulties during extrusion, e.g., pressures and temperatures were varied to address extrudate properties during extrusion, making it difficult to produce consistent lignin fiber. Once extrusion parameters are optimized further, diameter variation can be minimized. More particularly, use of a stable extrusion temperature, pressure and take-up speed can provide consistent fiber diameters.

The tensile strength Weibull parameters from 27 single carbon fibers were 3.66 (m) and ~630 MPa ($\sigma_0$) for shape and scale parameters, respectively (see FIGS. 3A-3B). These parameters were previously developed to calculate the interfacial shear strength. See Van der Zwaag, Journal of Testing and Evaluation, 1989, 17(5):292-298; Wilson, Journal of Materials Science, 1997, 32(10):2535-2542; Beetz, Fibre Science and Technology, 1982, 16:81-94; and Naito et al., "Tensile and Fexural Properties of Single Carbon Fibers," in ICCM-18, 2011: Jeju Island, South Korea. The presently calculated parameters show a high scale parameter but lower shape parameter relative to other lignin Weibull parameters, indicating higher strength lignin carbon fibers but a wider range of properties. Without being held to any one theory, this observation could be due to variation in lignin molecule size after the fractionation process. Relative to other studies associated with attempts to develop carbon fibers from lignin precursors (see Kadla et al., Carbon, 2002, 40:2913-2920; and Lin et al., Journal of Wood Chemistry and Technology, 2013, 34(2):111-121), the present mechanical properties are relatively high. Additional thermal treatments can be employed, as can tensioning of the fibers during stabilization and carbonization. These optional additional steps can affect lignin carbon structure, reduce defect density, provide further improvements in mechanical properties, and increase the crystalline regions, thus increasing the effect of tensioning/alignment and mechanical properties.

Figure 4:
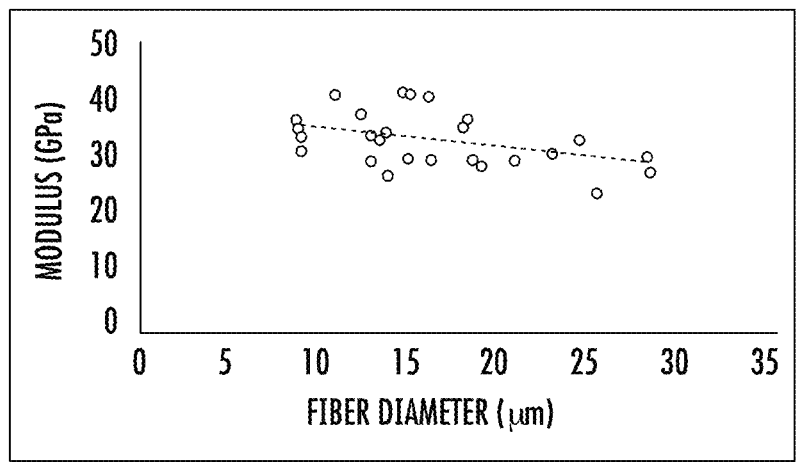
FIG. 4 is a graph showing modulus (measured in gigapascals (GPa)) versus fiber diameter (in microns (μm)) for switchgrass lignin carbon fiber. A linear trend line is fitted to the data (line equation: y=−0.3475x+38.847; $R^2$=0.211). The trend shows that as the fiber diameter gets smaller, the modulus tends to increase.

There is a correlation between fiber diameter and mechanical properties. As the fibers decrease in diameter, the modulus increases due to more effective stabilization, as oxidation of the fiber is easier with a smaller diameter. As seen in FIG. 4, it appears that a 5 μm fiber would have an approximate modulus of 36 GPa relative to 220 GPa for a standard modulus PAN carbon fiber. The relationship of fiber diameter to modulus is not as well defined for lignin based carbon fibers relative to PAN based carbon fibers, due to higher variability in the lignin precursor fiber production process. Commercially available PAN carbon fibers are produced in highly controlled wet-spinning environments and there is a wealth of industrial experience for manufacturing PAN based fibers. Thus, mechanical properties for PAN show less variation.

Figure 5:
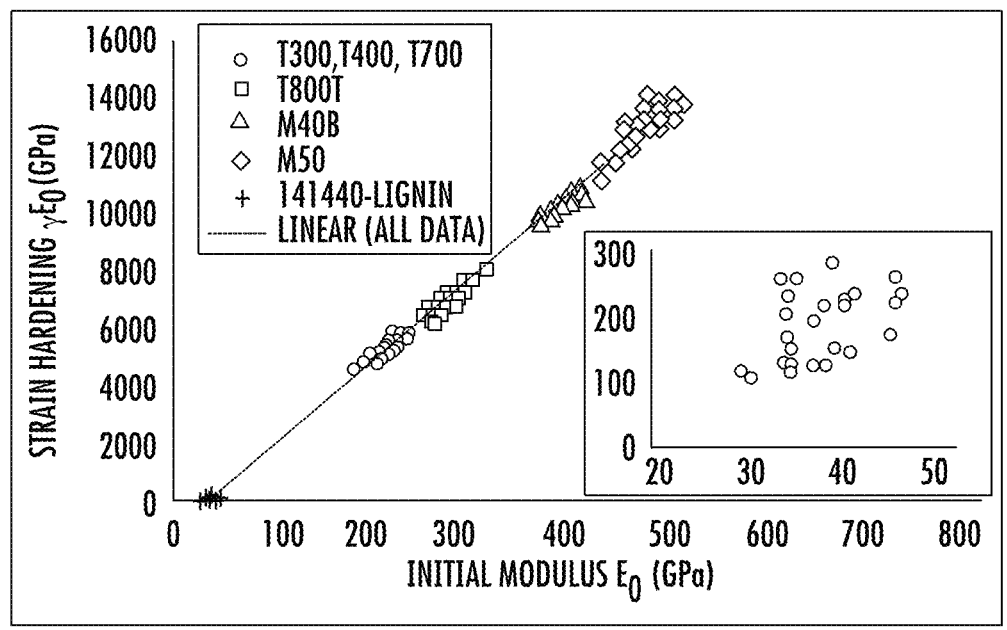
FIG. 5 is a graph showing the strain hardening (stiffening) (measured in gigapascals (GPa)) versus initial modulus (measured in GPa) for synthetics-derived carbon fibers, i.e., "T300", "T400", and "T700" (circles), "T800" (squares), "M40B" (triangles), and "M50"(diamonds), (data from Kant and Penumadu (Composites Part A: Applied Science and Manufacturing, 2014, 66:201-208)) and switchgrass lignin carbon fiber ("+"). A linear trend line is fitted to the data (line equation: y=29.065x−918.71; $R^2$=0.99). The inset shows is an expanded view of the data for the switchgrass lignin carbon fiber (circles).
Figure 6A:
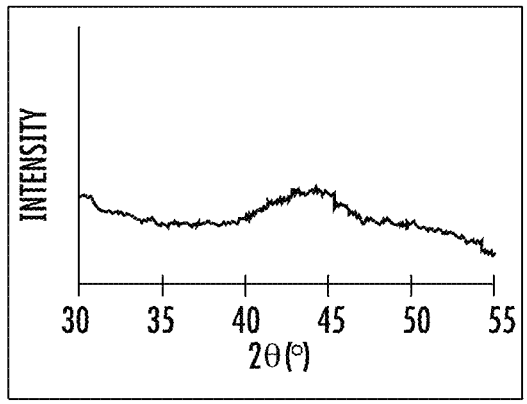
FIG. 6A is a wide-angle X-ray diffraction (XRD) pattern for the 2θ scan from 30 to 55 degrees (°) for switchgrass lignin carbon fibers.
Figure 6B:
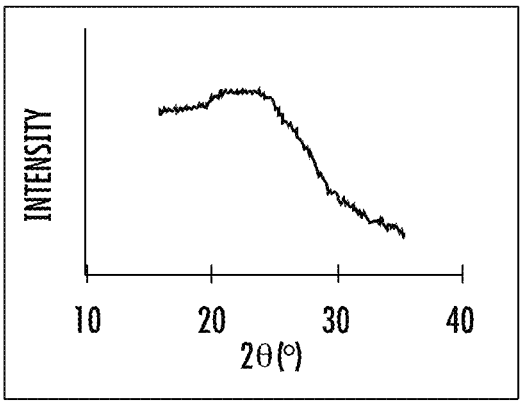
FIG. 6B is a wide-angle X-ray diffraction (XRD) pattern for the 2θ scan from 16 to 35 degrees (°) for switchgrass lignin carbon fibers.
Figure 6C:
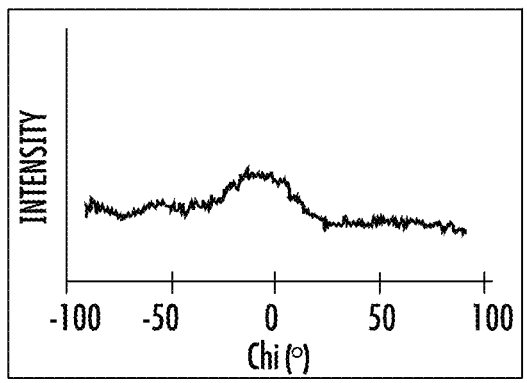
FIG. 6C is a wide-angle X-ray diffraction (XRD) pattern for the Chi scan from −90 to 90 degrees (°) for switchgrass lignin carbon fibers. A small peak exists around 0° Chi indicating some orientation of the fiber.
Figure 6D:
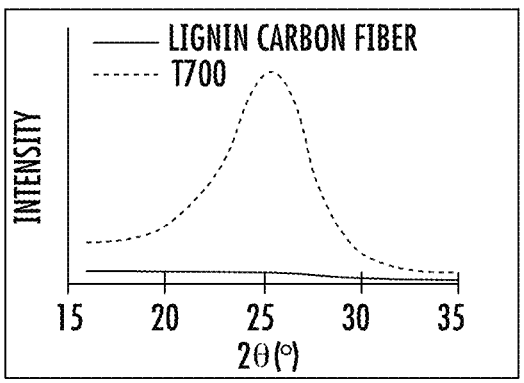
FIG. 6D is a graph showing a comparison of the wide-angle X-ray diffraction (XRD) patterns for a control synthetics-derived carbon fiber (T700; dashed line) and a switchgrass lignin carbon fiber (solid line).

Interestingly, the presently disclosed lignin carbon fibers show a nonlinear increase in modulus with tensile strain, which is similar to PAN based carbon fiber samples. See Kant and Penumadu, Composites Part A: Applied Science and Manufacturing, 2014, 66:201-208. PAN carbon fiber shows a distinct relationship between the initial tensile modulus value and its increase with applied axial strain as described in Equation 2. Lignin carbon fiber exhibits similar non-linear stiffening behavior but to a lesser extent than was found for PAN based carbon fibers. See FIG. 5.

$$E(\varepsilon)=(\gamma E_0)^*\varepsilon+E_0 \quad [2]$$

In this equation, $\gamma E_0$ is the change in modulus versus strain and $E_0$ is the initial storage modulus. PAN carbon fibers typically follow Equation 3:

$$\gamma E_0=29.36^*E_0-1010 \quad [3]$$

See Kant and Penumadu, Composites Part A: Applied Science and Manufacturing, 2014, 66:201-208. Without being bound to any one theory, the observation that lignin carbon fibers adhere to this equation as well could indicate that this equation describes a universal feature of all carbon fiber.

Amorphous Microstructure:

The wide-angle X-ray diffraction results for carbonized lignin fibers are shown in FIGS. 6A-6D. Charts for evaluating the location of peaks near 26° and 43° 2θ, which are typically observed for PAN based carbon fibers, and the azimuthal scan about the (002) peak are shown. Little to no crystallinity can be observed for lignin-based carbon fibers based on these diffraction patterns. Thus, a fundamentally different microstructure develops in the presently disclosed lignin-based carbon fibers compared to commercial PAN based fibers. The diffraction analysis presented is limited because the peaks are of low in intensity, full-width half-max (FWHM) is undeterminable, and results yield little crystalline structure information.

Without being bound to any one theory, the highly amorphous microstructure of lignin carbon fiber could be a result of the complex nature of the lignin molecule. Several factors limit the growth of crystalline regions within the lignin molecule during stabilization and oxidation, including entanglements, a heterogeneous molecular backbone, small phenolic groups that are not a part of the primary polymer chain, and contaminants. In comparison, PAN involves simple chemical modifications to obtain a turbostratic graphitic structure (dehydrogenation, cyclization, and carbonization), while the lignin molecule involves a multitude of different reactions and bonds to resemble a structure that is remotely similar to graphite. See FIGS. 7A-7C.

Interfacial Results:

The ability of a reinforcing fiber to transfer stress to a polymer matrix is governed by interfacial shear strength (IFSS) and is one of the most important parameters governing the strength of a fiber reinforced composites. Commercial PAN based carbon fibers undergo extensive surface treatment, including additional sizing, to provide a good interface with a target resin system. However, the lignin carbon fibers described herein have no surface treatments. The presently disclosed subject matter is believed to provide interfacial shear strength of unmodified lignin based carbon fibers with a resin system for the first time. See Table 2. The SFFT results for the presently disclosed lignin carbon fiber indicate an interfacial shear stress of 16.7 MPa. Delamination zones tend to be nonexistent or quite small (~10 μm) due to the larger number of fractures along the fiber. Without being bound to any one theory, this finding could be due to natural surface functionalization from lignin precursors.

TABLE 2

The Interfacial Results for Lignin Carbon Fiber

| Measurements | Fiber Length (μm) | IFSS (MPa) |
| --- | --- | --- |
| 431 | 228.1 ± 109.3 | 16.7 ± 6.3 |

The shape and size of the delamination zones suggest interfacial damage along the fiber during SFFT. The start of birefringent areas around a fiber fracture signal transfer of stress to the resin. Therefore, a gap between birefringent areas around a fiber fracture indicates delamination or fiber slippage. See Lew et al., Journal of Adhesion Science and Technology, 2007, 21(14):1407-1424. Although the interface becomes damaged with increased strain, most fiber fractures tend to propagate into the resin signifying a strong interface with the lignin carbon fiber.

Another finding of the presently disclosed subject matter is that while interfacial damage occurs, the fiber does not pull out of the matrix, indicating the presence of significant interfacial shear strength with the epoxy resin system. Other fiber/resin systems that are commercially available with tailored sizing tend to show interfacial shear strengths in the range of 20-43 MPa. See Zhao et al., Colloids and Surfaces A: Physicochemical and Engineering Aspects, 2012, 413: 58-64; and Park, J. Colloid Interface Sci., 2000, 225(2):384-393. Examination of the delamination zones of the presently disclosed composites illustrated significant bonding by propagating fractures into the matrix where the fibers fracture and large stressed regions signifying relatively effective stress transfer from untreated lignin carbon fiber to resin. Due to a lower carbonization temperature (1000° C.) employed according to the presently disclosed subject matter for producing lignin carbon fiber, functional groups, such as hydroxyl and methoxyl groups, could remain on the surface of the fiber leading to a higher IFSS observed. See Sudo and Shimizu, Journal of Applied Polymer Science, 1992, 44:127-134; and Brodin et al., Holzforschung, 2012, 66(2).

Additional modifications to the manufacturing process of the presently disclosed lignin based carbon fibers, such as optimal stabilization and carbonization, possible integration of suitable sizing agents, and improved fiber properties could further enhance IFSS and resulting reinforced composite properties. A factor that affects interface shear stress is the tensile strength of the carbon fiber and increasing lignin carbon fiber strength properties could further enhance its interface shear properties, providing optimization of lignin carbon fiber reinforced composite systems. Due to its relatively high interfacial shear strength for unsized carbon fiber, the lignin carbon fiber produced according to the presently disclosed subject matter could be of use for various applications that take advantage of carbon fiber interfacial properties, such as chopped fiber composites. The presently described composites could also be suitable for non-structural and semi-structural applications.

Figure 8A:
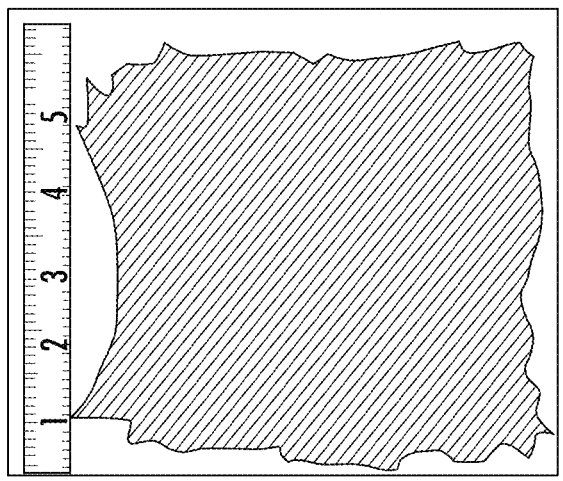
FIG. 8A is a schematic drawing of a 14 centimeter (cm) by 14 cm carbon fiber composite comprising switchgrass lignin carbon fibers produced using vacuum assisted resin transfer molding (VARTM).
Figure 8B:
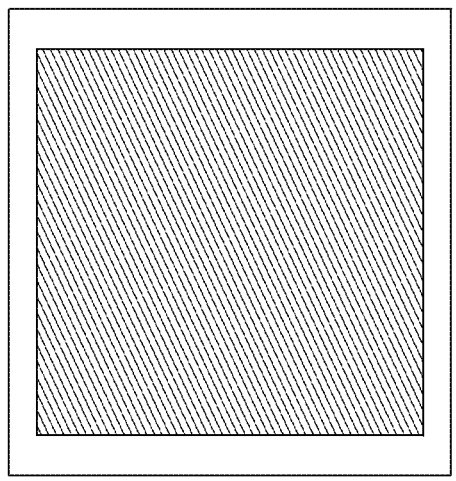
FIG. 8B is a schematic drawing of the composite shown in FIG. 8A after trimming. The measurements of the trimmed composite are 13 centimeters (cm) by 13 cm.

Mechanical Behavior of Lignin Based Carbon Fiber Composites:

A reinforced composite laminate using the lignin carbon fibers was manufactured using VARTM, resulting in a 14 cm by 14 cm panel as shown in FIG. 8A. The composite was trimmed to 13 cm by 13 cm using a diamond blade saw. The trimmed composite possessed somewhat consistent density (3.43±0.07 kg/m$^2$) and uniform thickness (0.2±0.02 cm) across the sample. See FIG. 8B.

High-resolution strain mapping through three-dimensional digital image correlation (DIC) was used to identify local tensile strain deformation on the surface of the fabricated composite. Samples were cut to 100 cm by 12.5 cm and GS10 glass fiber tabs were attached. The samples were speckled with a random pattern as DIC mapped strain by tracking relative displacements in the applied random speckle pattern on the sample during deformation. Table 3 shows the results collected from DIC and tensile testing of along fiber axis samples of the square laminates.

TABLE 3

The Mechanical Results for Lignin Carbon Fiber Composite

| Samples | Failure Stress (MPa) | Failure Strain (mm/mm) | Modulus (GPa) |
|---|---|---|---|
| 6 | 85.0 ± 11.5 | 0.0094 ± 0.001 | 9.1 ± 0.6 |

The present composite samples demonstrated an average failure strength of 85 MPa and average modulus of 9 GPa. The failure mode for the composite samples was either lateral or angled brittle failure in the gauge region. This type of failure indicates high interfacial shear strength relative to fiber strength, whereas a composite with an extremely high fiber strength relative to its interfacial shear strength tends to show explosive failure modes with failure largely along the fibers. See Okoli and Smith, Journal of Materials Science, 1998, 33:5415-5422. Having composites with non-explosive failures is preferable so that composite materials do not catastrophically fail.

The Voigt model (or rule of mixtures) was used to estimate the composite modulus based on volume fraction of fibers and carbon fiber properties along the fiber axis. For the composite shown in FIG. 8B, the composite modulus, $E_{11}$, is estimated to be 16.1 GPa using Equation 4:

$$E_M V_M + E_F V_F = E_c \quad [4]$$

where $V_F$ is fiber volume, $E_F$ is fiber modulus, $V_M$ is matrix volume, $E_M$ is matrix modulus, and $E_c$ is composite modulus. Studies indicated a value of 9 GPa as per Table 3 and the lower observed value is expected due to a lack of highly aligned and continuous carbon fibers in the laminate. The manufactured composites were produced in non-optimal conditions due to misalignment of the fibers in the preform during VARTM. The presently produced lignin carbon fiber was cut from a spool and therefore fiber plies were loose non-woven mats. Subsequently, it was difficult to achieve 100% fiber alignment and uniform density across the composite. In addition, most fibers were non-continuous and voids were introduced during the VARTM process, although efforts were made to minimize defects. During scale-up of the fiber manufacturing process, the fibers can be made into bundles (i.e., "tows"), and woven into fabrics, aligned or chopped according to methods known in the field of carbon fiber composites. Improvement in the alignment of the fibers according to these processes can improve panel quality, reduce out of plane deformation during tensile testing and reduce or eliminate premature failure.

Composite properties are a culmination of mechanical, interfacial, and structural properties. Possible alterations to the presently disclosed subject matter can be employed to affect the graphitic structure of lignin fibers, reduce fiber defects, optimize biomass precursors, modify extrusion equipment to handle biomass volatiles, and increase temperatures and/or modify temperature cycles during stabilization/carbonization. The optional additional steps can take advantage of lignin carbon fiber's superior matrix interaction (e.g., as compared to PAN fiber) and/or increase modulus and failure stress to provide additional structural composite embodiments.

Conclusions:

Organosolv fractionated lignin carbon fiber was produced and characterized via Nano-UTM, Single Fiber Fragmentation, and X-Ray Diffraction. In addition, a unidirectional carbon fiber reinforced polymer composite was manufactured with the lignin carbon fiber through a modified VARTM process. Lignin carbon fiber exhibited little to no surface defects from SEM and optical microscopy. Mechanical results for the carbon fiber indicated an average modulus close to 36 GPa and failure stress of ~600 MPa (3.66 and 630 MPa shape and scale parameters). Interfacial shear strength values were relatively high, around ~16 MPa for unsized lignin carbon fiber. SFFT saturated samples revealed fiber fractures propagating into the matrix and no fiber pullout. These interface strength results indicate that lignin carbon fiber would be useful for applications that take advantage of interfacial strengths, such as chopped fiber composites or fillers. XRD results and analysis demonstrated little to no crystalline regions in the fibers, which, without being bound to any one theory, could be the reason for low modulus of the fibers compared to commercially available PAN based fibers. Nevertheless, lignin based carbon fibers tend to follow the same strain hardening trend found in other carbon fibers, which suggests a general rearrangement of amorphous carbon when strain is applied. After the lignin carbon fiber was fully characterized, unidirectional mats were placed in a preform inside a VARTM system and produced into a composite. Fiber alignment and quantity varied across the panel during production. The composite panel mechanical properties were ~9 GPa and ~85 MPa for modulus and failure strength, respectively. Composite samples demonstrated lateral brittle failures in the gage region indicating a large ratio of interface to mechanical strength. The presently disclosed lignin carbon fiber composites exhibited non-explosive failure mechanisms with minimal fiber pullout as seen in SFFT.

Overall, the presently disclosed switchgrass lignin carbon fiber demonstrated desirable mechanical and interfacial properties, particularly for applications in chopped carbon fiber composites for structural applications. The advantage of lignin based carbon fiber over commercial PAN based carbon fibers (that require additional sizing) with regard to interfacial adhesion suggests that lignin carbon fiber would be preferable in some applications that mobilize the interface, such as discontinuous fiber based composites, fused deposition modeling for additive manufacturing, and fillers. The results presented herein are an improvement to current lignin carbon fiber characterization techniques and lignin carbon fiber composite manufacturing, opening up the possibility of increased utilization of lignin carbon fiber, particularly in composites for automotive applications.

Example 2

Interface Strength and Surface Chemistry of Organosolv Lignin Carbon Fibers Based on Different Feedstocks and Biocomposites Thereof Organosolv Fractionated Lignin Carbon Fibers:

Eight different lignin carbon fibers were selected to observe the effect of different lignocellulosic feedstocks, processing parameters, and blends. Table 4, below, shows a summary of the lignin carbon fibers used. Toray T700S (Toray Carbon Fibers America, Inc., Santa Ana, Calif., United States of America) was selected as an industrial comparison to the presently disclosed lignin carbon fibers.

TABLE 4

Processing Conditions for the Lignin Carbon Fiber Samples

| Sample | Precursor | Organosolv Temp. (° C.) | Preprocessing | Spinning Equipment | Stab. Rate (° C./min) | Carb. Rate (° C./min) |
|---|---|---|---|---|---|---|
| C1 | Hardwood-Grass Blend | 160 | Blending of powders | Haake Minilab | 0.05 | 3.8 |
| C2 | Hardwood | 170 | — | Haake Minilab | 0.05 | 3.8 |
| C3 | Hardwood | 160 | — | Haake Minilab | 0.05 | 3.8 |
| C4 | Grass, PEG | 160 | Pelletized | Haake Minilab | 0.017 | 3.8 |
| C5 | Grass | 140 | Pelletized | AJA | 0.26 | 3.0 |
| C6 | Hardwood | 130-160 | Additional drying | AJA | 0.1 | 3.8 |
| C7 | Grass | 140 | Pelletized | AJA | 0.025 | 3.8* |
| C8 | Grass | 140 | Pelletized | AJA | 0.025 | 3.8 |

AJA = Alex James and Associates;
*Carbonized in reducing environment

The production process for the lignin carbon fiber began with fractionation of the source biomass. The lignin was separated from the biomass and contaminants following an organosolv process as described above in Example 1. The resulting lignin was further purified and dried in preparation for the extrusion process. Green lignin fiber was produced using a multi-filament dry spinning technique on a custom-built single screw extruder from Alex James and Associates, Inc. (AJA; Greer, S.C., United States of America) with four heating zones. The spin head houses a Zenith metering pump and 12-hole (150 μm) spinneret assembly. See Baker et al., Journal of Applied Polymer Science, 2012, 124(1):227-234. To optimize the process, the lignin powder is initially extruded and evaluated on a lab-scale Haake Minilab extruder. The Haake MiniLab is a counter-rotating twin-screw extruder modified to have a 200 μm spinneret assembly with a heating band. The temperature zones on the AJA extruder are adjusted based on the lab-scale extrusion and thermal data from a PerkinElmer Diamond Differential Scanning calorimeter (DSC) (PerkinElmer, Inc., Waltham, Mass., United States of America) and a PerkinElmer Pyris 1 ThermoGravimetric analyzer (TGA) (PerkinElmer, Inc., Waltham, Mass., United States of America). The DSC/TGA values for the samples are shown in Table 5.

TABLE 5

DSC and TGA Data for Lignin Powder Samples

| Sample | Tg (° C.) | ΔCp (J/g° C.) | DTG** Peak (° C.) | DTG** Peak Value (%/min) | Temp. @ 5% Mass loss (° C.) | Temp @ 10% mass loss (° C.) | Char (%) |
|---|---|---|---|---|---|---|---|
| C1 | 120 | 0.43 | 378 | -4.74 | 261 | 302 | 36.8 |
| C2 | 128 | 0.34 | 378 | -3.28 | 256 | 301 | 41.6 |
| C3 | 121 | 0.38 | 375 | -3.99 | 251 | 284 | 34.2 |
| C4 | 108 | 0.28 | 388 | -4.33 | 245 | 281 | 35.8 |
| C5* | 108 | 0.36 | 365 | -4.3 | 243 | 281 | 33.7 |
| C6 | NA | NA | NA | NA | NA | NA | NA |
| C7* | 108 | 0.36 | 365 | -4.3 | 243 | 281 | 33.7 |
| C8* | 108 | 0.36 | 365 | -4.3 | 243 | 281 | 33.7 |

*same biomass precursor;
**Derivative Thermogravimetry;
NA = not available

High Biomass Epoxy Resin:

A commercially available epoxy, Entropy Super Sap 100/1000 (Entropy Resins, Gardena, Calif., United States of America) was used as the polymeric matrix for composites of the lignin carbon fibers. This epoxy has high biomass content in addition to good mechanical and optical properties. More particularly, Super Sap 100/1000 utilizes epoxied pine oils with bio-based carbon content comprising approximately 40% of the total resin. While it has a considerable amount of biomass content, it is also transparent, providing in-situ observation of interface testing. Similar to the presently disclosed lignin carbon fiber, the resin is derived from renewable, sustainable resources.

MTS Nano-UTM Mechanical Testing:

In evaluating the mechanical properties of single fibers, a MTS Bionix Nano-Universal Testing Machine (UTM) (MTS Systems Corporation, Eden Prairie, Minn., United States of America) was used. The UTM uses a Nano-Mechanical Actuating Transducer (NMAT) to achieve high resolution for load and displacement (nN and nm). The NMAT is comprised of supporting springs, a capacitance gage, and an electromagnetic coil. The NMAT keeps a zero displacement and measures load on sample through the voltage feedback controlled by a PID loop. An in-depth discussion on the UTM and theory is found elsewhere. See Kant and Penumadu, Composites Part A: Applied Science and Manufacturing, 2014, 66:201-208.

The grip and fiber mounting procedure used was that previously described. See Kant and Penumadu, Composites Part A: Applied Science and Manufacturing, 2014, 66:201-208. This technique was developed to minimize bending moments about the fiber at the grip. It makes use of rigid aluminum templates instead of industry adopted plastic or cardboard templates. In addition, cut nylon strips were glued to the templates to support the sample until it was mounted on the UTM for testing. Machined blocks are used to keep the rigid aluminum templates at a fixed gage length during sample preparation.

Typically, once the mechanical properties were determined, a two-parameter Weibull distribution was applied to the data to determine shape and size parameters. These parameters allow for easy comparison from sample to sample and the size parameter is used in the calculation of the interfacial shear strength. See Feih and Mouritz, Composites Part A: Applied Science and Manufacturing, 2012, 43(5):765-772; Feih et al., "Establishing a Testing Procedure for the Single Fiber Fragmentation Test," 2004, Rises National Laboratory; Sager et al., Composites Science and Technology, 2009, 69(7-8):898-904; and Naito et al., Journal of Materials Science, 2011, 47(2):632-642. [8-11]. The development of the Weibull parameters and equations was previously described. See Zhou et al., Materials Letters, 2010, 64(3):246-248; and van der Zwaag, Journal of Testing and Evaluation, 1989, 17(5):292-298.

Single Fiber Fragmentation Testing:

For determining interfacial strengths, the Single Fiber Fragmentation Test (SFFT) was used. See Feih et al., "Establishing a Testing Procedure for the Single Fiber Fragmentation Test," 2004, Rises National Laboratory. SFFT entails slowly applying tensile load to a dogbone shaped composite with a single imbedded carbon fiber or single filament composite (SFC). To produce SFC's, an open dogbone mold is used. Carbon fibers are mounted in slits half the height of the mold and resin is poured in the mold. Once the SFC is cured at room temperature, the dogbone samples are removed and placed in a custom frame for SFFT. As load is applied to the sample, the fiber begins to break thereby creating fiber fragments. The fiber in the SFC continues to fracture until the sample is saturated, at which more stress or strain on the sample does not lead to more fractures in the fiber. At this saturation point, several aspects about the SFC can be observed: (1) delamination zones, (2) fiber fragment lengths, and (3) failure characteristics of the fiber fractures. Delamination zones are areas around fiber fractures that indicate a damaged interface (no bonding between the fiber and resin). All of these features are observed under polarized microscopy as they are birefringent and give a complete interface profile. See Kim and Nairn, Journal of Composite Materials, 2002, 36(15):1825-1858.

A custom frame was designed and built specifically to handle SFFT samples. Briefly, the frame used a National Electrical Manufacturers Association (NEMA; Rosslyn Va., United States of America) motor to turn an ACME screw that pulls/pushes the crosshead. Strain is measured using an external linear variable differential transformer (LVDT) and load is measured using a Futek 250 lb capacity load cell (Futek Advanced Technology, Inc., Irvine, Calif., United States of America). The frame is controlled using a LabView compactRio (cRIO) system (National Instruments, Austin, Tex., United States of America). It is designed for semi-automatic and manual control. Typically, it operates in manual mode for SFFT, allowing users to pause testing at various displacements to record the number of fiber fractures.

X-Ray Photoelectron Spectroscopy:

X-ray Photoelectron Spectroscopy (XPS) was carried out on a PHI 5000 VersaProbe II (Physical Electronics, Inc., Chanhassen, Minn., United States of America) equipped with a monochromatic AlKα (1486.6 eV) X-ray source. Data from XPS was analyzed using the PHI MultiPak software (Physical Electronics, Inc., Chanhassen, Minn., United States of America), after performing a Shirley background correction. Calibration was carried out by aligning of the spectra with reference to the O1s line at 531.0 eV.

Results:

Table 6 shows the summarized mechanical data for the single fiber testing. Lignin carbon fiber samples varied from ~250-610 MPa failure stress with a modulus variation of ~28-40 GPa.

TABLE 6

Mechanical Properties of Carbon Fiber Samples and Weibull Statistics

| Sample | Fiber Dia. (μm) | Failure Stress (MPa) | Failure Strain (%) | Modulus (GPa) | Shape* | Scale* | $R^{2*}$ |
|---|---|---|---|---|---|---|---|
| C1 | 16.3 ± 1.4 | 609.7 ± 189.3 | 1.16 ± 0.38 | 39.9 ± 6.3 | 3.78 | 664.8 | 0.881 |
| C2 | 26.3 ± 1.0 | 448.4 ± 103.2 | 1.41 ± 0.33 | 33.9 ± 4.8 | 4.68 | 483.7 | 0.973 |
| C3 | 15.2 ± 0.7 | 488.5 ± 136.6 | 1.27 ± 0.31 | 38.8 ± 6.6 | 3.30 | 537.8 | 0.932 |
| C4 | 28.9 ± 3.2 | 297.7 ± 114.6 | 0.84 ± 0.34 | 36.9 ± 3.9 | 2.74 | 333.9 | 0.946 |
| C5 | 16.2 ± 6.2 | 580.4 ± 159.1 | 1.74 ± 0.34 | 34.8 ± 4.0 | 4.19 | 625.4 | 0.896 |
| C6 | 32.2 ± 4.9 | 305.5 ± 135.7 | 0.95 ± 0.36 | 30.6 ± 4.3 | 2.37 | 335.4 | 0.963 |
| C7 | 15.6 ± 1.2 | 281.9 ± 87.3 | 1.08 ± 0.27 | 27.9 ± 1.8 | 3.09 | 301.5 | 0.941 |
| C8 | 14.6 ± 1.9 | 360.4 ± 88.7 | 1.11 ± 0.22 | 33.6 ± 2.7 | 3.71 | 387.7 | 0.905 |
| T700S | 6.8 ± 0.3 | 3342.1 ± 1342.1 | 1.52 ± 0.42 | 247.4 ± 13.9 | 3.59 | 3767.4 | 0.952 |

*from two parameter Weibull Distribution

Figure 9:
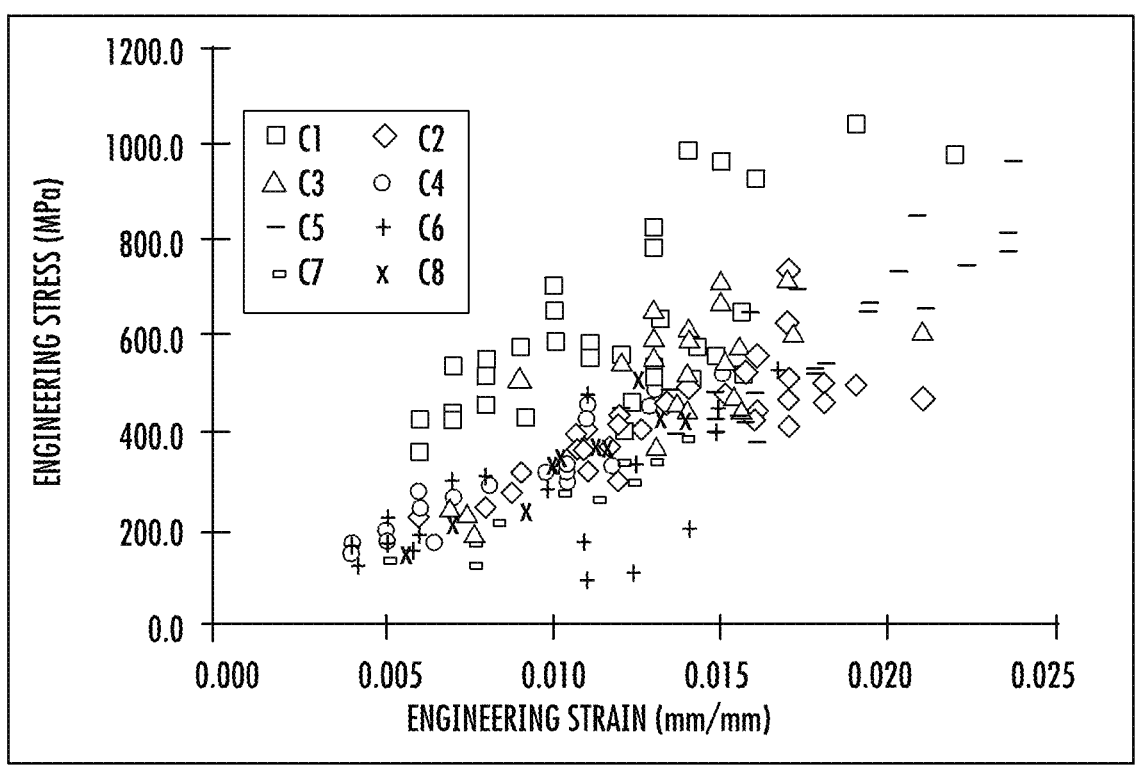
FIG. 9 is a graph of stress (in megapascals (MPa)) versus strain (millimeters per millimeter (mm/mm)) values for the lignin carbon fibers described in Example 2: "C1" data shown in squares; "C2" data shown in diamonds; "C3" data shown in triangles; "C4" data shown in circles; "C5" data shown in dashes; "C6" data shown in "+"s; "C7" data shown in bars; and "C8" data shown in "x"s. Control commercial carbon fiber (T7002) results are at approximately 3500 MPa tensile strength.
Figure 10:
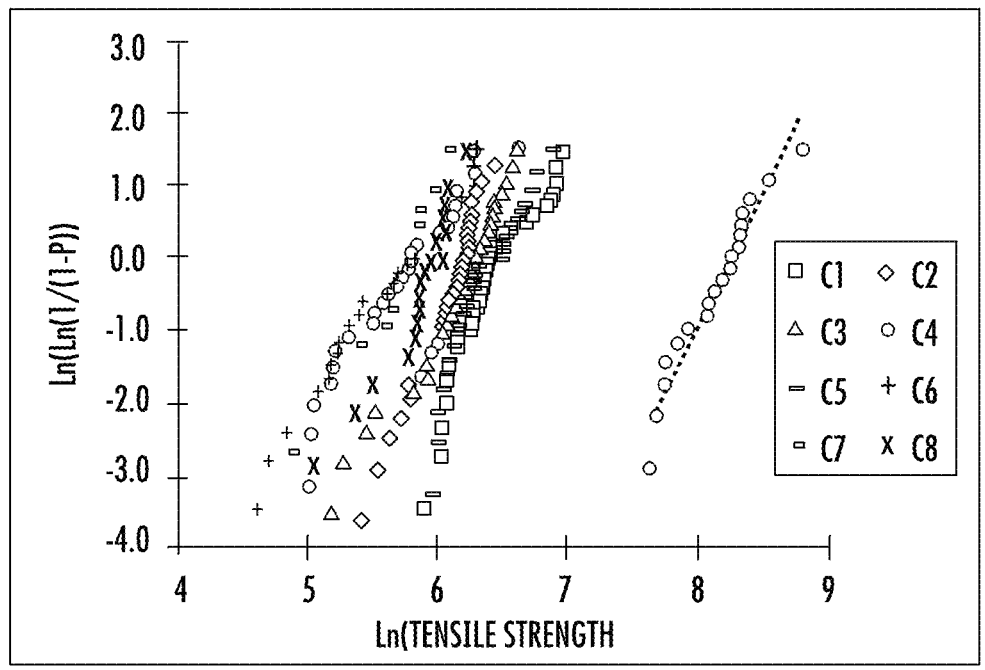
FIG. 10 is a graph of the Weibull distributions for the lignin carbon fiber samples of Example 2 and the control commercial carbon fiber (T700S). "C1" data shown in squares; "C2" data shown in diamonds; "C3" data shown in triangles; "C4" data shown in circles; "C5" data shown in thin bars; "C6" data shown in "+"s; "C7" data shown in thick bars; and "C8" data shown in "x"s. An Example of the determination of the shape and scale parameter is given for the control (T700S) sample (circles with dashed line).

FIG. 9 shows all tests for stress versus strain. Standard deviations of mechanical properties were the largest for C5 and C1. In addition, shape and size parameters are determined from the linear trend lines of the Weibull distributions for fiber strength. See FIG. 10.

The average fiber fragmentation lengths were measured in-situ during SFFT and are listed in Table 7. The fragmentation length is defined as the length from one fiber break to the next fiber break. T700S samples demonstrated considerably larger fragmentation lengths and thus, it was difficult to capture an entire fragment at 20× magnification.

The experimental SFFT data and calculated interfacial shear strength (IFSS) values are summarized in Table 7. It appears that there are two groups of samples for interface values: one set of LCF samples with lower IFSS values (7-10 MPa) and one with higher IFSS values (15+MPa).

TABLE 7

Parameters from SFFT and Calculated IFSS

| Sample | Weibull $\sigma_f$ (MPa) | Fiber Diameter (μM) | Avg. Fiber Frag. Length (μm) | Lcrit (μm) | Average IFSS (MPa) |
|---|---|---|---|---|---|
| C1 | 664.8 | 16.3 ± 1.4 | 194.1 ± 50.8 | 258.8 ± 67.7 | 20.9 |
| C2 | 483.7 | 26.3 ± 1.0 | 285.6 ± 89.4 | 380.8 ± 119.2 | 16.7 |
| C3 | 537.8 | 15.2 ± 0.7 | 282.1 ± 119.7 | 376.1 ± 159.6 | 10.9 |
| C4 | 333.9 | 28.9 ± 3.2 | 445.8 ± 203.7 | 594.4 ± 271.6 | 8.1 |
| C5 | 573.8 | 16.2 ± 6.2 | 228.1 ± 109.3 | 304.1 ± 145.7 | 15.2 |
| C6 | 335.4 | 32.2 ± 4.9 | 472.3 ± 216.6 | 629.8 ± 288.4 | 8.6 |
| C7 | 301.5 | 15.6 ± 1.2 | 84.7 ± 24.9 | 112.9 ± 33.2 | 20.8 |
| C8 | 387.7 | 14.6 ± 1.9 | 91.0 ± 27.9 | 121.3 ± 37.2 | 23.3 |
| T700S | 3767.1 | 6.9 ± 0.1 | 909.9 ± 636.1 | 1213.2 ± 848.1 | 10.0 |

Figure 11:
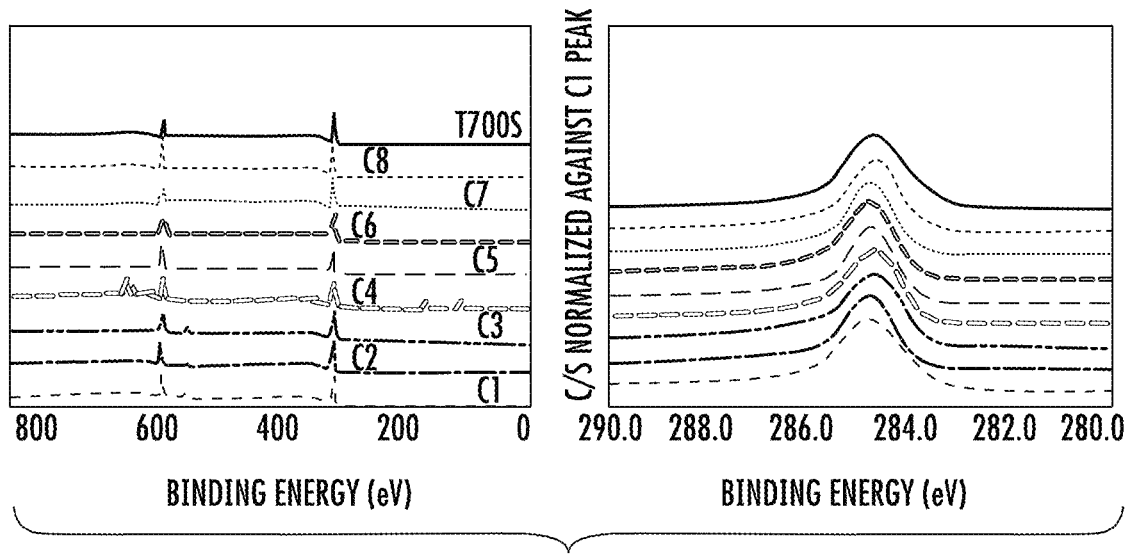
FIG. 11 is a pair of graphs showing the X-ray photoelectron spectroscopy (XPS) spectra for the lignin carbon fiber samples described in Example 2 and a control synthetic carbon fiber sample (T700S). From bottom to top, the spectra correspond to C1, C2, C3, C4, C5, C6, C7, C8, and T700S fiber samples. The O1 peak is at about 521.0 eV and the C1 peak is at about 284.4 eV. The full spectra are shown at the left and expansions showing the C1 peak are shown at the right.

XPS results are displayed in FIG. 11 and are normalized against the intensity of the C1 peak. By normalizing against the C1, the relative size of the other PS peaks (O1, Si, and others) can be compared.

Discussion:

The present lignin carbon fibers displayed suitable mechanical properties with several sets performing near 600 MPa failure strength and 39 GPa modulus. C1 in particular demonstrated high mechanical properties with several fibers testing +800 MPa failure strength. Compared to previous reports, these mechanical properties appear to be substantially high, particular for pure lignin carbon fibers. Blends with cellulose or other polymers have tested in this range, however, for pure lignin carbon fiber samples, few have produced lignin carbon fiber with these mechanical properties. See Sudo and Shimizu, Journal of Applied Polymer Science, 1992, 44:127-134; Baker et al., Journal of Applied Polymer Science, 2012, 124(1):227-234; Ma et al., ChemSusChem, 2015, 8(23):4030-4039; Kadla et al., Carbon, 2002, 40(15):2913-2920; and Nordstrom et al., Journal of Applied Polymer Science, 2013, 130(5):3689-3697. The LCF samples of the presently disclosed subject matter show higher mechanical properties, even though there is still a discrepancy between lignin carbon fiber and commercial PAN carbon fiber, as displayed by the control (T700S). Further, it appears that the present LCFs could be particularly useful for non-structural or low strength composite applications or any applications not requiring high strength (chopped fiber composites, fillers, etc.).

The best performing LCF sets tended to come from the Haake Minilab extruder. Spinning on the Haake extruder could lead to better mechanical properties for a variety of reasons, such as the size and design of the extruder. The Haake is a twin screw, which allows for improved mixing and melting of the lignin powder. In regards to the size of the extruder, it is much easier to manage the spinning. The Haake is a mini-extruder and therefore, is much less complex than the AJA extruder, with not as many parameters and variability. With only two heating zones, a smaller spinneret, and smaller chamber, the Haake is easy to control and adjust during extrusion. In addition, internal pressures are much lower due to less material being processed and a smaller barrel. Furthermore, residence time for lignin powder is considerably lower in the Haake compared to the AJA. Residence times can differ between 10-20 minutes. This additional time in the AJA barrel may lead to degradation, onset of crosslinking, and low $M_w$ phenolic groups becoming volatile. The closed system of the AJA extruder can also result in higher extrudate pressures, trapping volatiles in the fibers and creating voids. These factors could lead to lower mechanical properties and should be controlled according to the guidance provided herein, e.g., via equipment upgrades.

However, the Haake Minilab can be a less suitable production technique for industrial demands. Spinning on the Haake Minilab produces approximately 10 g of lignin fiber in 45 minutes. For typical composite application, this is not enough material. In contrast, the AJA can produce larger amounts of lignin fiber. Therefore, the development of modified or custom extrusion equipment could be helpful for large-scale production, employing the guidance provided herein. For instance, extruder L/D ratio, screw design, venting, spinneret diameter and geometry, winders, stretching godets and rollers, feeding palletization and purge are factors that can be considered in the design of modified extrusion equipment.

The LCF samples demonstrated significant interface strengths for no sizing. More particularly, the IFSS values for the unsized fibers ranged from 8-23 MPa. Since these fibers are untreated, they could provide some advantage in manufacturing. Furthermore, the IFSS values for the best samples are significant such that these fibers can be used in applications where good interface adhesion is utilized. Control T700S IFSS values were approximately ~10.5 MPa, which is consistent with other T700S/epoxy IFSS reported values. See Ramirez et al., Journal of Materials Science, 2008, 43:5230-5242. In relation to other commercial fiber/resin IFSS values, the values reported here are generally lower; however, the T700S is not optimized for the Super Sap 100/1000 used in this experiment. See Sager et al., Composites Science and Technology, 2009, 69(7-8):898-904. Several of the present LCF samples performed better than their PAN counterpart and could suit certain applications better than PAN carbon fiber.

The crack and delamination zone behavior immediately after saturation is another indicator of interface adhesion in addition to IFSS values. IFSS values are dependent on several variables (fiber diameter, mechanical performance) and do not necessarily fully reflect interface behavior. Thus, while providing useful information, these values do not always give a complete interfacial strength profile. Qualitative interface adhesion can be determined from the analysis of fiber fractures and delaminations at saturation. With regard to the lignin, LCF samples showed substantial crack propagation into the matrix resin, signifying considerable interface strength. Additionally, delamination zones do not progress down the carbon fiber, but rather begin growing into the resin, similar to the fiber fracture or crack. In contrast, the T700S samples show no crack propagation and, as samples near saturation, delamination zones progress down the fiber. No transfer of stress or fiber fracture into the matrix material (resin) is usually a sign for a non-optimized interface and weak bonding. See Kim and Nairn, Journal of Composite Materials, 2002, 36(15):1825-1858. Delamination zones on average for T700S samples measured 403 μm compared to ~75 μm for LCF samples.

Figure 12:
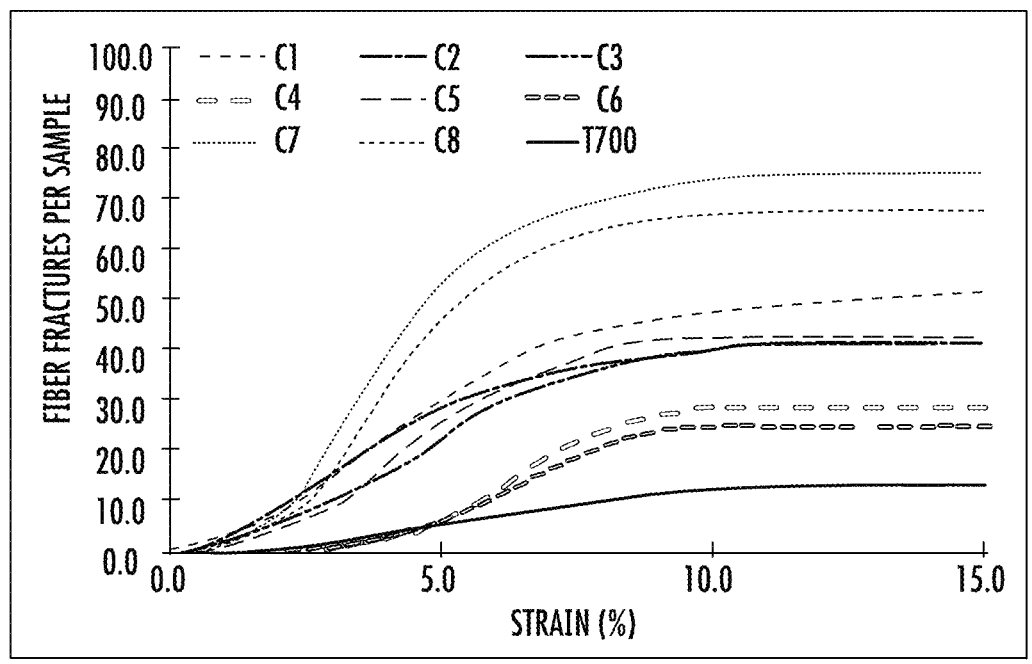
FIG. 12 is a graph showing the fiber fractures per sample versus strain percentage (%) for single fiber fragmentation testing of composites comprising the lignin carbon fibers described in Example 2 and a control carbon fiber (T700).

FIG. 12 presents the interfacial characteristic curves for the carbon fiber samples. There are three distinct groups for the curves (excluding the control). Fiber fractures are dependent on several things, including interface adhesion and mechanical performance. If a LCF has poor mechanical properties, it should be expected that the fiber would fracture more than a fiber with better mechanical properties. This is what was observed for C7 and C8.

Figure 13:
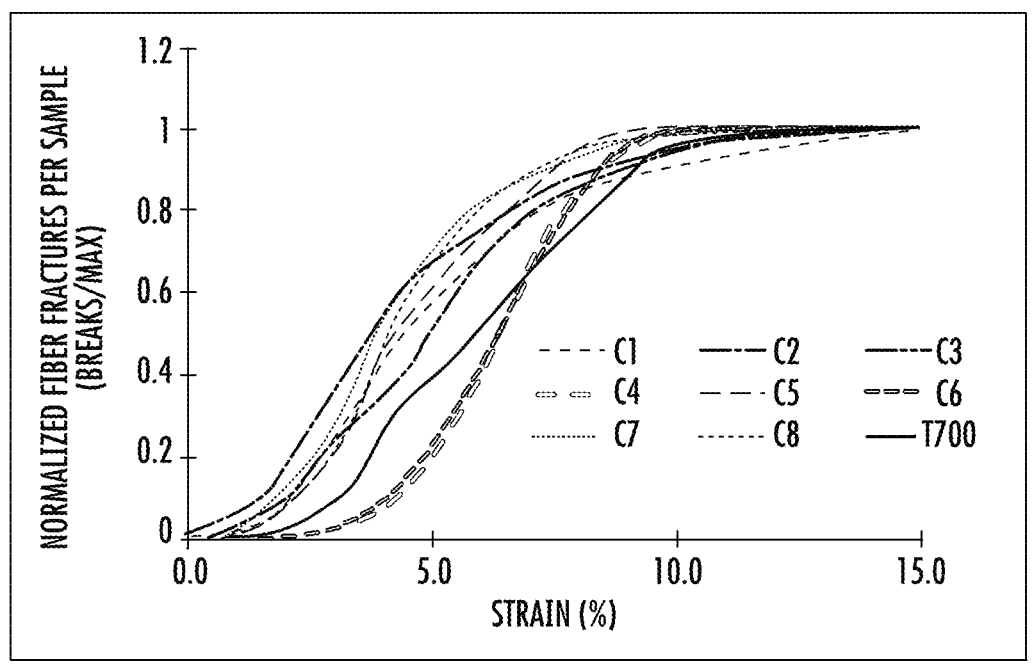
FIG. 13 is a graph showing normalized fiber fractures per sample (Breaks/Maximum) versus strain (%) for the samples described in FIG. 12.

To isolate only the shape of the curve and eliminate the influence of mechanical performance on the data, the curves were normalized against the maximum value. This method allows only the shape of the curve to be displayed. See FIG. 13. Thus, most samples tend to follow a similar profile. For example, although C7 and C8 were dramatically different in FIG. 12, it appears that they behave similarly to the majority of the LCF samples. The two samples with the weakest interface values, C4 and C6, showed a different curve. For most of the LCF sets, it appears that each set reaches saturation roughly at the same point, but C4 and C6 are delayed in initial onset of fiber fractures. With a weaker interface, it is possible that the interface is not engaged until a small displacement occurs. Without being bound to any one theory, this could be due to slight fiber slippage at the start of tensile loading.

The T700 fiber set shows a slight delay into fiber fracture and is one of the last sets to reach saturation. The T700S fiber is considerable stronger and therefore, it is possible that the fiber fractures do not begin initially, especially in comparison to the weaker LCF sets. It is also the most ductile carbon fiber used in this study and therefore, could need higher strains for fiber fracture. Thus, on average, it requires more strain to reach displacement than most of the LCF samples. It should be noted that the T700S evaluated herein is sized for industrial applications. Unsized T700S would not perform as well.

The overall best performing LCF set is C1, which is also the only blend of lignin biomass sources (hardwood and switchgrass). While it is not thoroughly understood, the differing biomass sources tend to work well together as the coniferyl alcohol (G) and p-coumaryl alcohol (H) groups are more susceptible to cross-linking while the synapyl alcohol (S) groups allow for easier melt spinning. See Baker et al., Journal of Applied Polymer Science, 2012, 124(1): 227-234; and Baker, "Low Cost Carbon Fiber from Renewable Resources", 2010, Oak Ridge National Laboratory. Hardwood sources tend to have much higher S to G ratios ranging from ~1.2 to 2.8 depending on the exact source while softwood and switchgrass sources tend to have lower S to G ratios (~0.52) and therefore more G and H groups. See Davison et al., Applied Biochemistry and Biotechnology, 2006, 129-132:427-435; Bose et al., Bioresour. Technol, 2009, 100(4):1628-1633; and Hu et al., Bioresour. Technol., 2010, 101(9):3253-3257. This difference in monolingol groups allows the hardwood biomass to act as a plasticizer and the combination of the two sources produces a high quality carbon fiber. See Paul et al., in "Recent Progress in Producing Lignin-Based Carbon Fibers for Functional Applications," GrafTech Internation Holdings, Inc., 2015, 1; and Norberq et al., Journal of Applied Polymer Science, 2013, 128(6):3824-3830.

Figure 14:
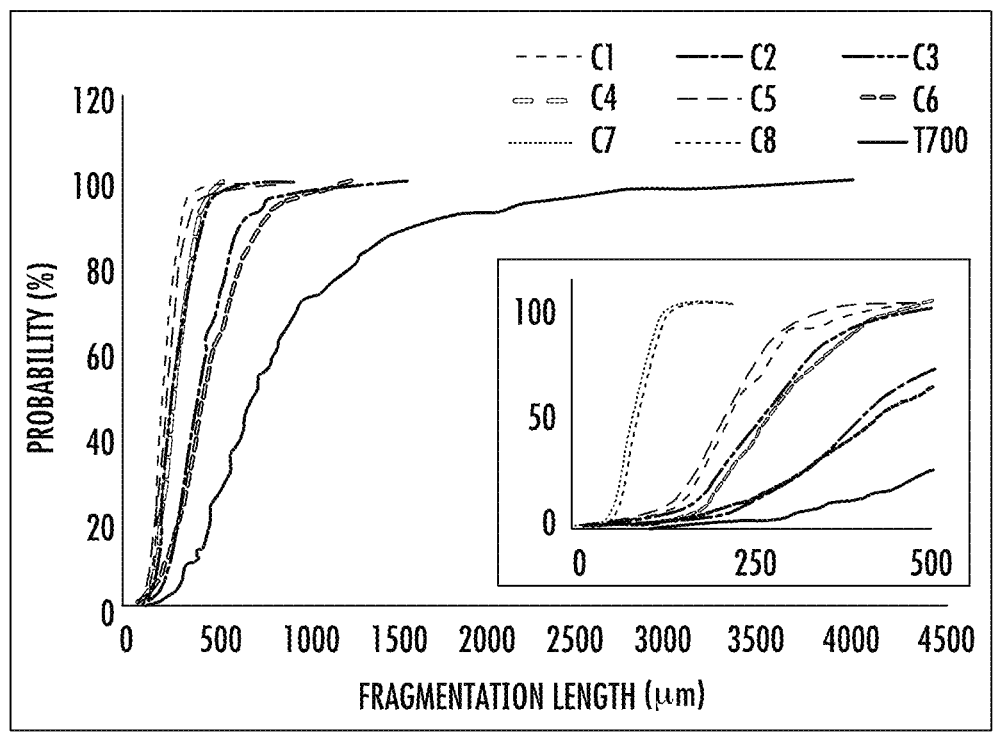
FIG. 14 is a graph showing probability (%) versus fragmentation length (microns (μm)) for composite samples comprising the lignin carbon fibers described in Example 2 and a control carbon fiber (T700). The inset shows the graph narrowed to show data of fragmentation lengths of 0 to 500 microns.

To analyze the uniformity of the interfacial properties, the distribution of fragmentation lengths for each sample was determined. See FIG. 14. A tight distribution around an average fragmentation length can indicate uniform adhesion along the fiber/resin interface. Large distributions suggest a non-uniform interfacial adhesion with sections of the fiber with strong IFSS values while other sections with low IFSS values.

The distributions of fragmentation lengths follow a Weibull distribution similar to the failure strengths of the lignin carbon fiber. Other distributions were evaluated; however, r-squared values were significantly lower relative to a Weibull analysis.

Figure 15:
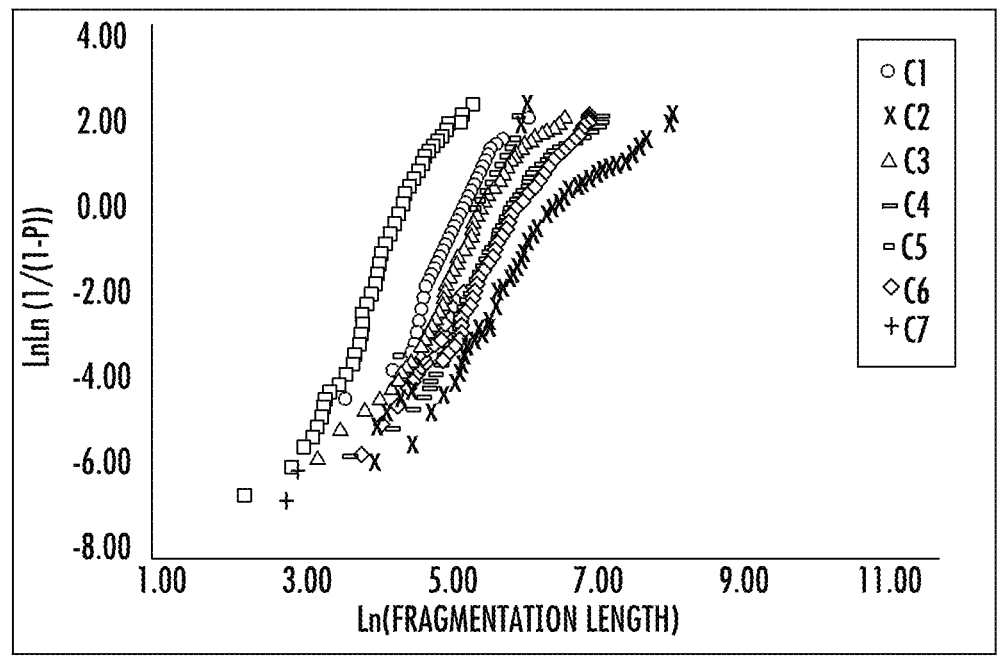
FIG. 15 is a graph of the Weibull distributions of fragmentation lengths for composites comprising the lignin carbon fibers described in Example 2. "C1" data shown in circles; "C2" data shown in "x"s; "C3" data shown in triangles; "C4" data shown in thin bars; "C5" data shown in thick bars; "C6" data shown in diamonds; and "C7" data shown in "+"s.

In observing the Weibull distributions of the fragmentation lengths, it can be easy to determine which samples performed well. See FIG. 15. Those LCF samples that exhibited high IFSS values (C1, C2, C7, and C8) have lower scale parameters, indicating that, on average, these samples have smaller fragmentation lengths. Furthermore, these samples also display the highest shape parameters, which is representative of a lower distribution of fragmentations. Thus the samples that are most consistent and do not have a large distribution of fragmentation lengths display the best interfacial properties. This trend makes sense, as strong interfacial adhesion along the entire length would perform superior relative to a sample with inconsistent interfacial adhesion.

Figure 16:
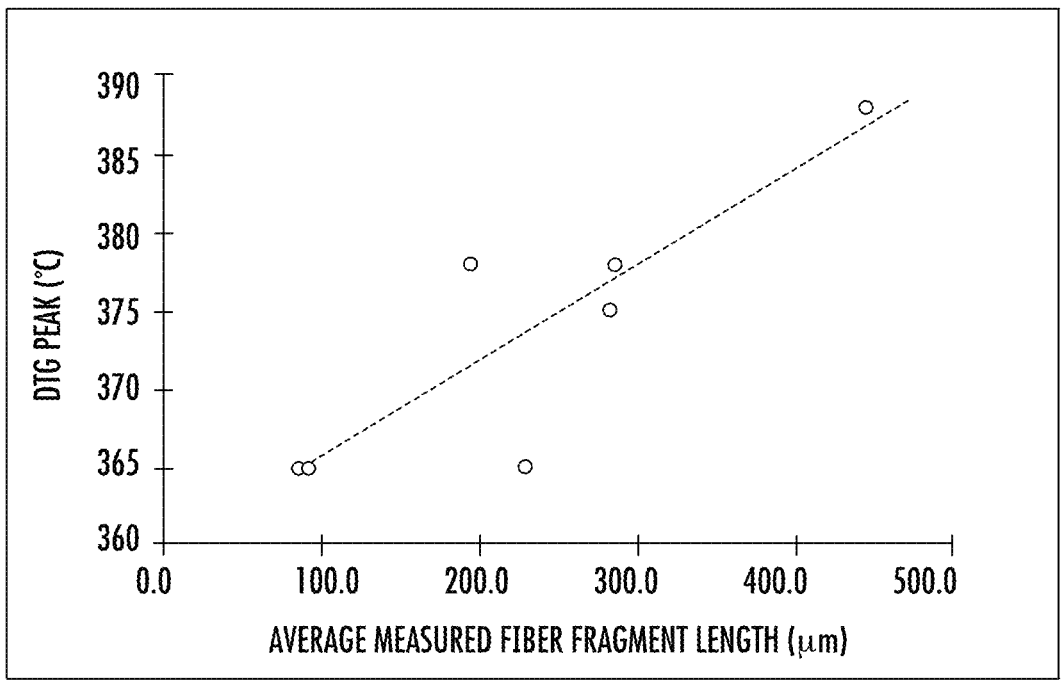
FIG. 16 is a graph showing the derivative thermogravimetric (DTG) analysis peak value (degrees Celsius (° C.)) versus fiber fragmentation length (microns (μm)) for the lignin carbon fibers described in Example 2 and their composites. A linear trend line is fitted to the data (line equation: y=0.0609x+359.41; $R^2$=0.0.7425).

Through comparison of the results, there is a small trend between the derivative thermogravimetry (DTG) peak value and the average fiber fragment length, which would also correspond to the interface strength and mechanical properties. While it is not a particularly strong trend, it is significant enough to say that the DTG peak could be an early indicator of mechanical and interfacial performance. See FIG. 16. The DTG curve is determined from the derivative of a TGA curve and the peak is lowest value along the curve. Thus, it determines the temperature at which most of the material degradation occurs. Subsequently, as this peak value decreases in temperature, the material is degrading faster, which could be related to the polymer Mw, polydispersity, or low Mw phenolic groups.

Figure 17:
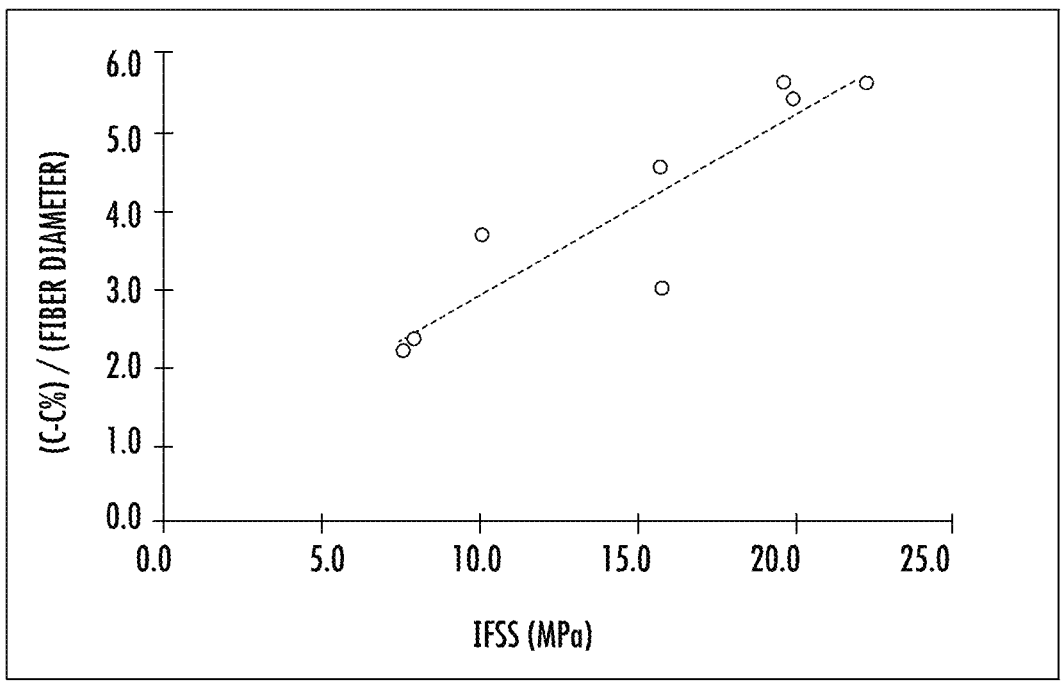
FIG. 17 is a graph of the carbon-carbon percentage (%, from C1 peak) normalized by fiber diameter versus interfacial shear strength (IFSS, measured in megapascals (MPa)) for the lignin carbon fibers described in Example 2. A linear trend line is fitted to the data (line equation: y=0.2169x+ 0.323; $R^2$=0.0.8241).
Figure 18:
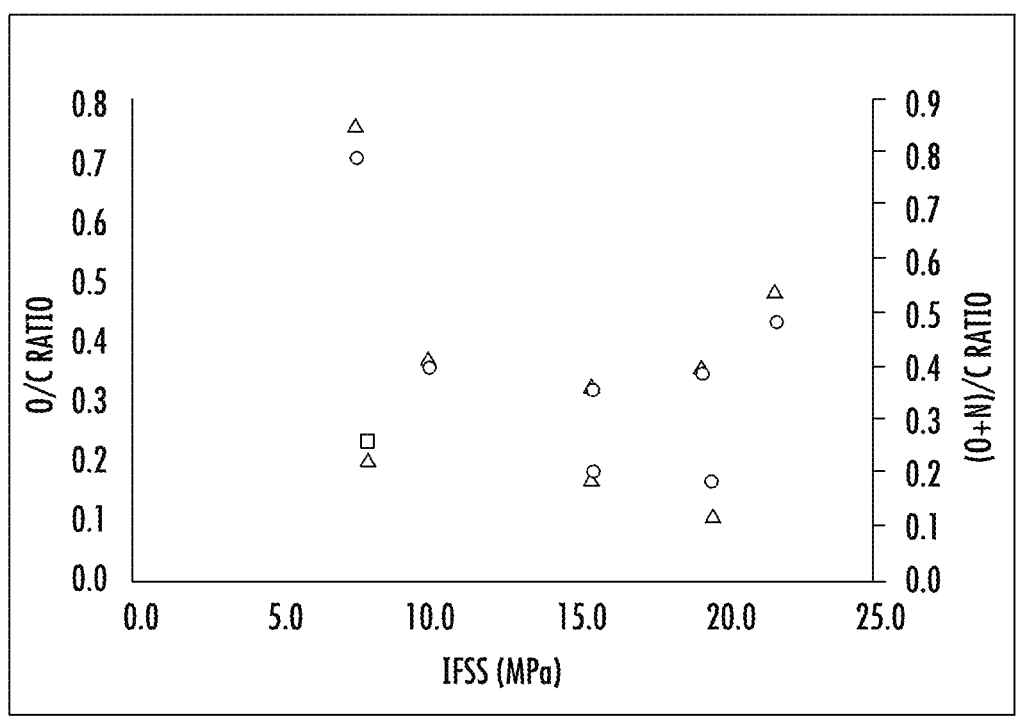
FIG. 18 is a graph showing the oxygen/carbon ratios (triangles) and oxygen+nitrogen/carbon ratios (circles) of lignin carbon fibers described in Example 2 measured using X-ray photoelectron spectroscopy (XPS) versus interfacial shear strength (IFSS, measured in megapascals (MPa)).

XPS was used to determine the surface chemistry of the carbon fiber samples and determine if functional groups are affecting the interfacial bonding. FIGS. 17 and 18 display the results and correlations between the XPS and SFFT results. There was an observable trend between C-C % of the C1 peak and IFSS values. See FIG. 17. The data was normalized against the fiber diameter because (1) the fiber samples for XPS are circular not flat with ranging diameters, and (2) this appears to be a reasonable approximation for normalization. It is possible that this is a false trend as C-C % increases with fiber strength, IFSS are highly dependent on fiber strength values, and the entire XPS data set does not correlate to interfacial properties determined by SFFT. See FIG. 18. This unusual trend could be affected by variability in the SFFT method and data interpretation for XPS. SFFT is a regularly utilized procedure for interface evaluation; however, it is well known that there is large deviations and variability in the data due to sample preparation and testing. Generally, most SFFT results are not acceptable unless 10+ samples have been tested. See Feih et al., "Establishing a Testing Procedure for the Single Fiber Fragmentation Test," 2004, Rises National Laboratory; and Rich et al., "Round Robin Assessment of the Single Fiber Fragmentation Test," in American Society for Composites, 2012, West Lafayette, Ind. [9, 28]. XPS is different, in that the procedure is well defined but the data is open to interpretation and therefore, is user dependent. See Ishitani, Carbon, 1981, 19(4):269-275; and Yumitori, Journal of Materials Science, 2000, 35:139-146.

Conclusions:

Eight lignin carbon fiber samples were evaluated for mechanical and interfacial properties, including surface chemistry. The results indicate that the quality of the lignin carbon fiber can depend upon the extruder used to produce the raw lignin fiber. However, for no sizing, the presently disclosed lignin carbon fibers performed well, in some cases outperforming the commercial T700S control sample. XPS results demonstrated that there were more oxidized carbon groups on the samples with higher IFSS values. It appears that the presently disclosed lignin carbon fibers can be useful in composites for applications requiring higher interface adhesion, such as chopped fiber composites, fillers, etc.

Example 3

Kraft Softwood Lignin Carbon Fibers

Lignin carbon fibers were produced from a commercially available lignin product isolated by kraft pulping of a softwood feedstock. More particularly, the commercially available lignin, i.e., INDULIN™ AT (WestRock Corporation, Norcross, Ga., United States of America), was dissolved in methanol and filtered to remove high molecular weight molecules. The filtered methanol solution was dried to provide a powder. The resulting powder was dried overnight in a vacuum oven at 80° C. The as-received lignin has an average molecular weight of about 7,190 g/mol, while the lower weight fraction recovered from the methanol solution has a molecular weight of about 3,500 g/mol or less. See Saito et al., ChemSusChem, 7, 221-228 (2014).

Green lignin fiber was produced using a multi-filament dry spinning technique on a custom-built single screw extruder from Alex James and Associates, Inc. (AJA; Greer, S.C., United States of America) with four heating zones. The spin head houses a Zenith metering pump and 12-hole (150 μm) spinneret assembly. See Baker et al., Journal of Applied Polymer Science, 2012, 124(1):227-234. The winder was set at a take up rate of 250 m/min. The fiber was stabilized at a rate of 0.1° C./min to a temperature of 250° C. The fibers were carbonized in a nitrogen atmosphere to 1000° C. at a rate of 10° C./min and held at 1000° C. for 30 min.

Figure 19:
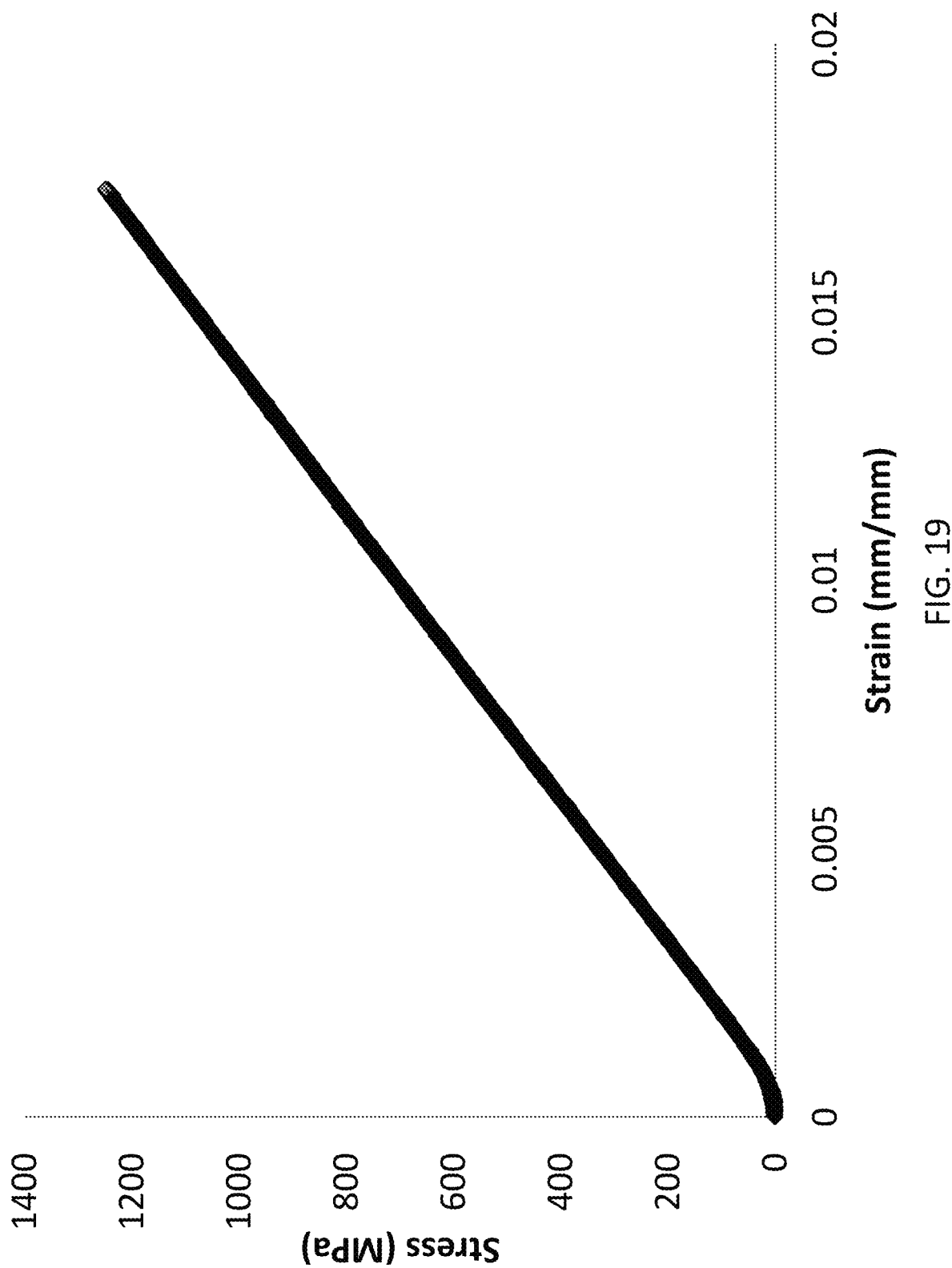
FIG. 19 is a graph of stress (in megapascals (MPa)) versus strain (millimeters per millimeter (mm/mm)) values for a single softwood lignin carbon fiber with a modulus of 74.5 gigapascals (GPa) and a strength of 1.28 GPa. A linear trend line is fitted to the data (line equation: y=74552x−40.247).

Mechanical results for the carbon fibers showed fibers with a modulus of about 74.5 GPa and failure stress of about 1.28 GPa. FIG. 19 shows a stress versus strain curve for the softwood carbon fibers.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A carbon fiber reinforced polymer composite comprising:
   a polymeric matrix material; and
   a lignin carbon fiber embedded in the polymeric matrix material, wherein the lignin carbon fiber is substantially non-crystalline and free of surface defects and has a regular circular cross-section; wherein the lignin carbon fiber is prepared from non-chemically modified lignin isolated from a lignocellulosic feedstock material selected from a grass or a combination of a grass and a hardwood via an organosolv pulping process performed at a temperature of about 140° C. to about 170° C. and by a process comprising thermostabilizing a raw lignin fiber prepared from the non-chemically modified lignin by heating the raw lignin fiber from room temperature to about 250° C. at a rate of about 0.017° C. per minute to about 0.1° C. per minute; and wherein the lignin carbon fiber is free of a surface treatment or coating, and is free of a carbon from a non-lignin source; and further wherein an interfacial shear strength (IFSS) between the lignin carbon fiber and the polymeric matrix material is higher than the IFSS would be between a non-lignin carbon fiber and the same polymeric matrix material.

2. The composite of claim 1, wherein the composite has a non-explosive failure mechanism.

3. The composite of claim 1, wherein the lignin carbon fiber is prepared by carbonizing a melt-spun lignin fiber under an inert atmosphere at a temperature of about 1000° C.

4. The composite of claim 1, wherein the polymeric matrix material comprises a thermoset polymer.

5. The composite of claim 4, wherein the thermoset polymer is an epoxy.

6. The composite of claim 1, wherein the lignocellulosic feedstock material is a grass.

7. The composite of claim 1, wherein the polymeric matrix material comprises a thermoplastic polymer.

8. A method of preparing a carbon fiber reinforced polymer composite, the method comprising:
   (a) providing a lignin carbon fiber, wherein the lignin carbon fiber is substantially non-crystalline and free of surface defects and has a regular circular cross-section; wherein the lignin carbon fiber is prepared from non-chemically modified lignin prepared from a lignocellulosic feedstock material selected from a grass or a combination of a grass and a hardwood via an organosolv pulping process performed at a temperature of about 140° C. to about 170° C. and by a process comprising thermostabilizing a raw lignin fiber prepared from the non-chemically modified lignin by heating the raw lignin fiber from room temperature to about 250° C. at a rate of about 0.017° C. per minute to about 0.1° C. per minute to provide a thermostabilized lignin fiber and carbonizing the thermostabilized lignin fiber to provide the lignin carbon fiber; and further wherein the lignin carbon fiber is free of a surface treatment or coating, and is free of a carbon from a non-lignin source; and
   (b) embedding the lignin carbon fiber in the polymeric matrix material or a precursor thereof.

9. The method of claim 8, wherein step (b) comprises placing the lignin carbon fiber in a mold; introducing a thermosetting or thermoplastic polymer resin into the mold, optionally wherein the polymer resin is an epoxy resin; and curing the polymer resin.

10. The method of claim 8, wherein step (a) comprises:
    (i) providing a lignocellulosic feedstock material selected from a grass and a combination of a grass and a hardwood;
    (ii) treating the lignocellulosic feedstock material to provide an isolated lignin, wherein said treating comprises an organosolv pulping process performed at a temperature of about 140° C. to about 170° C.;
    (iii) melt-spinning the isolated lignin to provide a lignin fiber;
    (iv) thermostabilizing the lignin fiber by heating the lignin fiber from room temperature to about 250° C. at a rate of about 0.017° C. per minute to about 0.1° C. per minute to provide a thermostabilized lignin fiber; and
    (v) carbonizing the thermostabilized lignin fiber, to provide a lignin carbon fiber.

11. The method of claim 10, wherein the carbonizing of step (v) comprises heating the thermostabilized lignin fiber under an inert atmosphere from room temperature to about 1000° C. at a rate of about 10° C. per minute or less; and holding the temperature at about 1000° C. for a period of time.

12. The method of claim 10, wherein the isolated lignin provided by step (ii) has a glass transition temperature ($T_g$) of between about 107° C. and about 135° C.

13. The method of claim 10, wherein the isolated lignin provided by step (ii) has a purity of about 95% or more.

14. The method of claim 8, wherein the lignin carbon fiber has a diameter of about 40 microns or less.

15. The method of claim 8, wherein the lignin carbon fiber has a failure stress of about 250 MPa or more.

16. The method of claim 8, wherein the composite has a tensile modulus of about 9 GPa and/or a failure stress of about 85 MPa.

17. A discontinuous fiber composite, wherein the discontinuous fiber composite comprises a polymeric matrix material and a plurality of short lignin carbon fibers embedded in the polymeric matrix material, wherein the lignin carbon fibers are prepared from non-chemically modified lignin prepared from a lignocellulosic feedstock material via an organosolv pulping process performed at a temperature of about 140° C. to about 170° C., wherein the lignocellulosic feedstock material is selected from a grass or a combination of a grass and a hardwood, and further wherein the lignin carbon fibers are prepared by a process comprising thermostabilizing raw lignin fibers by heating the raw lignin carbon fibers from room temperature to about 250° C. a rate of about 0.017° C. per minute to about 0.1° C. per minute.

18. The discontinuous fiber composite of claim 17, wherein the lignin carbon fibers are free of a surface treatment or coating.

\* \* \* \* \*